United States Patent
Gupta et al.

(10) Patent No.: US 9,911,058 B2
(45) Date of Patent: Mar. 6, 2018

(54) METHOD, SYSTEM AND APPARATUS FOR UPDATING A SCENE MODEL

(71) Applicant: CANON KABUSHIKI KAISHA, Tokyo (JP)

(72) Inventors: Amit Kumar Gupta, Epping (AU); Quang Tuan Pham, North Ryde (AU)

(73) Assignee: Canon Kabushiki Kaisha, Tokyo (JP)

(*) Notice: Subject to any disclaimer, the term of this patent is extended or adjusted under 35 U.S.C. 154(b) by 144 days.

(21) Appl. No.: 14/577,008

(22) Filed: Dec. 19, 2014

(65) Prior Publication Data
US 2015/0178937 A1 Jun. 25, 2015

(30) Foreign Application Priority Data
Dec. 20, 2013 (AU) ................................ 2013273784

(51) Int. Cl.
| | |
|---|---|
| G06K 9/46 | (2006.01) |
| G06K 9/00 | (2006.01) |
| G06K 9/38 | (2006.01) |
| G06T 7/11 | (2017.01) |
| G06T 7/174 | (2017.01) |
| G06T 7/194 | (2017.01) |

(52) U.S. Cl.
CPC ....... *G06K 9/4638* (2013.01); *G06K 9/00664* (2013.01); *G06K 9/38* (2013.01); *G06T 7/11* (2017.01); *G06T 7/174* (2017.01); *G06T 7/194* (2017.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,229,918 B1* | 5/2001 | Toyama | ............... | G06K 9/6218 382/173 |
| 9,275,289 B2* | 3/2016 | Li | ............... | G06K 9/00825 |
| 2004/0151342 A1* | 8/2004 | Venetianer | ......... | G06K 9/00624 382/103 |
| 2007/0052803 A1* | 3/2007 | Chosak | ............... | G06K 9/00771 348/143 |
| 2008/0095435 A1* | 4/2008 | Lipton | ............... | G06K 9/00771 382/173 |
| 2008/0137950 A1* | 6/2008 | Park | ............... | G06K 9/00335 382/168 |

(Continued)

OTHER PUBLICATIONS

JK Aggarwal and WN Martin, "Dynamic Scene Analysis," NATO ASI Series, vol. F2, Image Sequence Processing and Dynamic Scene Analysis, 1983.*

(Continued)

*Primary Examiner* — Matthew Bella
*Assistant Examiner* — Soo Shin
(74) *Attorney, Agent, or Firm* — Canon USA, Inc. I.P. Division

(57) ABSTRACT

A method of updating a scene model for a foreground segmentation of an input image captured from a camera, is disclosed. One or more visual elements of the input image are determined. A spatial relationship between at least one of the visual elements and the scene model for a foreground segmentation of the input image is determined. The method updates the scene model for determining the foreground segmentation of the input image based on the determined spatial relationship.

10 Claims, 20 Drawing Sheets

(56) References Cited

U.S. PATENT DOCUMENTS

| | | | | |
|---|---|---|---|---|
| 2010/0226566 | A1* | 9/2010 | Luo | G06K 9/34 382/164 |
| 2012/0163658 | A1* | 6/2012 | Pakulski | G06T 7/2053 382/103 |
| 2013/0156305 | A1* | 6/2013 | Prasad | G06K 9/34 382/164 |
| 2013/0156314 | A1* | 6/2013 | Pham | G06T 7/0083 382/173 |
| 2013/0162867 | A1 | 6/2013 | Gupta et al. | |
| 2014/0133751 | A1* | 5/2014 | Reso | G06T 7/90 382/167 |
| 2014/0153829 | A1* | 6/2014 | Pham | G06K 9/34 382/173 |
| 2015/0248590 | A1* | 9/2015 | Li | G06K 9/00785 382/103 |
| 2015/0317821 | A1* | 11/2015 | Ding | G06T 7/00 345/420 |
| 2016/0155024 | A1* | 6/2016 | Partis | G06T 7/11 382/173 |
| 2016/0189388 | A1* | 6/2016 | Gupta | G06T 7/11 382/180 |

OTHER PUBLICATIONS

Ferdinan and Suryana, "CAMSHIFT improvement with mean-shift segmentation, region growing, and SURF method," International Journal of Communication & Information Technology, vol. 7, No. 2, Oct. 2013, pp. 53-64.*

Weikersdorfer et al. "Depth-Adaptive Supervoxels for RGB-D Video Segmentation," 20th IEEE International Conference on Image Processing (ICIP), Melbourne, Sep. 15-18, 2013, pp. 2708-2712.*

1) Schick, A., Bauml, M., Stiefelhagen, R. Improving foreground segmentations with probabilistic super-pixel Markov random fields, in Computer Vision and Pattern Recognition Workshops (CVPRW), 2012 IEEE Computer Society Conference on, Jun. 2012; IEEE: Jun. 2012; p. 27.

* cited by examiner

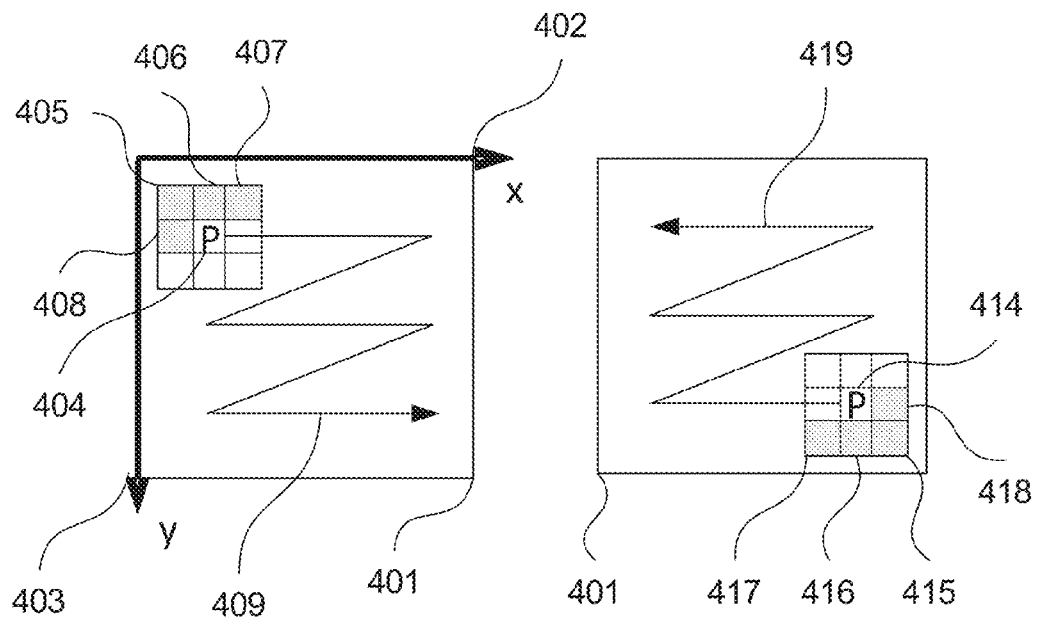
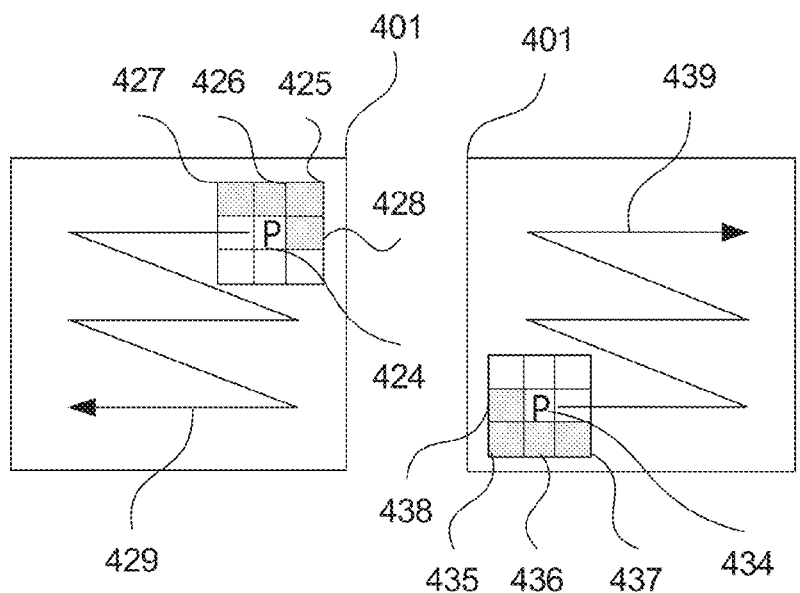
Fig. 4A  Fig. 4B
Fig. 4C  Fig. 4D

Pixels

Image

Empty Pixels represent grid point

Example Superpixel Segmentation

METHOD, SYSTEM AND APPARATUS FOR UPDATING A SCENE MODEL

REFERENCE TO RELATED PATENT APPLICATION(S)

This application claims the benefit under 35 U.S.C. § 119 of the filing date of Australian Patent Application No. 2013273784, filed Dec. 20, 2013, hereby incorporated by reference in its entirety as if fully set forth herein.

TECHNICAL FIELD

The present disclosure relates to object detection in a video and, in particular, to a method, apparatus and system for segmenting an image. The present disclosure also relates to a computer program product including a computer readable medium having recorded thereon a computer program for foreground segmentation of an image.

BACKGROUND

A video is a sequence of images. The images may also be referred to as frames. The terms 'frame' and 'image' are used interchangeably throughout this specification to describe a single image in an image sequence, or a single frame of a video. An image is made up of pixels where each pixel is represented by one or more values representing the visual properties at that pixel. For example, in one scenario three (3) values are used to represent Red, Green and Blue colour intensity at the pixel.

Scene modelling, also known as background modelling, involves modelling visual content of a scene, based on an image sequence depicting the scene. A usage of scene modelling is foreground segmentation by background subtraction. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background, through scene modelling of the non-transient background, and a differencing operation between that background and incoming frames of video. Foreground segmentation can be performed by using scene modelling and identifying portions of the modelled scene which are either moving, or recently changed/added, or both.

In one scene modelling method, the content of an image is divided into one or more visual elements, and a model of the appearance of each visual element is determined. A scene model may maintain a number of models for each visual element location, each of the maintained models representing different modes of appearance at each location within the scene model. Each of the models maintained by a scene model are known as "mode models" or "background modes". For example, there might be one mode model for a visual element in a scene with a light being on, and a second mode model for the same visual element at the same location in the scene with the light off.

The description of a mode model may be compared against the description of an incoming visual element at the corresponding location in an image of the scene. The description may include, for example, information relating to pixel values or DCT coefficients. If the description of the incoming visual element is similar to one of the mode models, then temporal information about the mode model, such as age of the mode model, helps to produce information about the scene. For example, if an incoming visual element has the same description as a very old visual element mode model, then the visual element location can be considered to be established background. If an incoming visual element has the same description as a young visual element mode model, then the visual element location might be considered to be background or foreground depending on a threshold value. If the description of the incoming visual element does not match any known mode model, then the visual information at the mode model location has changed and the location of the visual element can be considered to be foreground.

In one method, a visual element is a single pixel. Scene modelling using single pixel visual elements has disadvantages of high storage and computation cost due to pixel level modelling and comparison.

In another method, a group of 8×8 pixels is used as a visual element, referred to as block based scene modelling. The block based scene modelling has lower storage and computation cost compared to single pixel based method but suffers from blocky foreground segmentation. Additionally, the block based method has low robustness against shaky videos, e.g. caused by building tremors for a building mounted camera or caused by the environment for pole mounted cameras.

Hence, there is a need for a scene modelling method which has relatively lower storage and computation cost as well as higher robustness against shaky videos and more accurate object outlines.

SUMMARY

It is an object of the present invention to substantially overcome, or at least ameliorate, one or more disadvantages of existing arrangements.

According to one aspect of the present disclosure there, is provided a method of updating a scene model for a foreground segmentation of an input image captured from a camera, the method comprising:

determining one or more visual elements of the input image;

determining a spatial relationship between at least one of the visual elements and the scene model for a foreground segmentation of the input image; and updating the scene model for determining the foreground segmentation of the input image based on the determined spatial relationship.

According to another aspect, disclosed is an apparatus for updating a scene model for a foreground segmentation of an input image captured by a camera, the apparatus comprising:

means for determining one or more visual elements of the image;

means for determining a spatial relationship between at least one of the visual elements and the scene model for a foreground segmentation of the input image; and means for updating the scene model for determining the foreground segmentation of the input image based on the determined spatial relationship.

According to another aspect, disclosed is a system for updating a scene model for a foreground segmentation of an input image captured by a camera, the system comprising:

a memory for storing data and a computer program;

a processor coupled to the memory for executing the computer program, the computer program comprising instructions for:

determining one or more visual elements of the input image;

determining a spatial relationship between at least one of the visual elements and the scene model for a foreground segmentation of the input image; and updating the scene model for determining the foreground segmentation of the input image based on the determined spatial relationship.

Also disclosed is a computer readable medium comprising a computer program stored thereon for updating a scene model for a foreground segmentation of an input image captured by a camera, the program comprising:

code for determining one or more visual elements of the input image;

code for determining a spatial relationship between at least one of the visual elements and the scene model for a foreground segmentation of the input image; and code for updating the scene model for determining the foreground segmentation of the input image based on the determined spatial relationship.

Other aspects of the invention are also disclosed.

BRIEF DESCRIPTION OF THE DRAWINGS

One or more embodiments of the invention will now be described with reference to the following drawings, in which:

FIG. 4A shows an example scan direction of a geodesic distance transform image;

FIG. 4B shows another example scan direction of the geodesic distance transform image of FIG. 4A;

FIG. 4C shows still another example scan direction of the geodesic distance transform image of FIG. 4A;

FIG. 4D shows still another example scan direction of the geodesic distance transform image of FIG. 4A;

DETAILED DESCRIPTION INCLUDING BEST MODE

Figure 1:
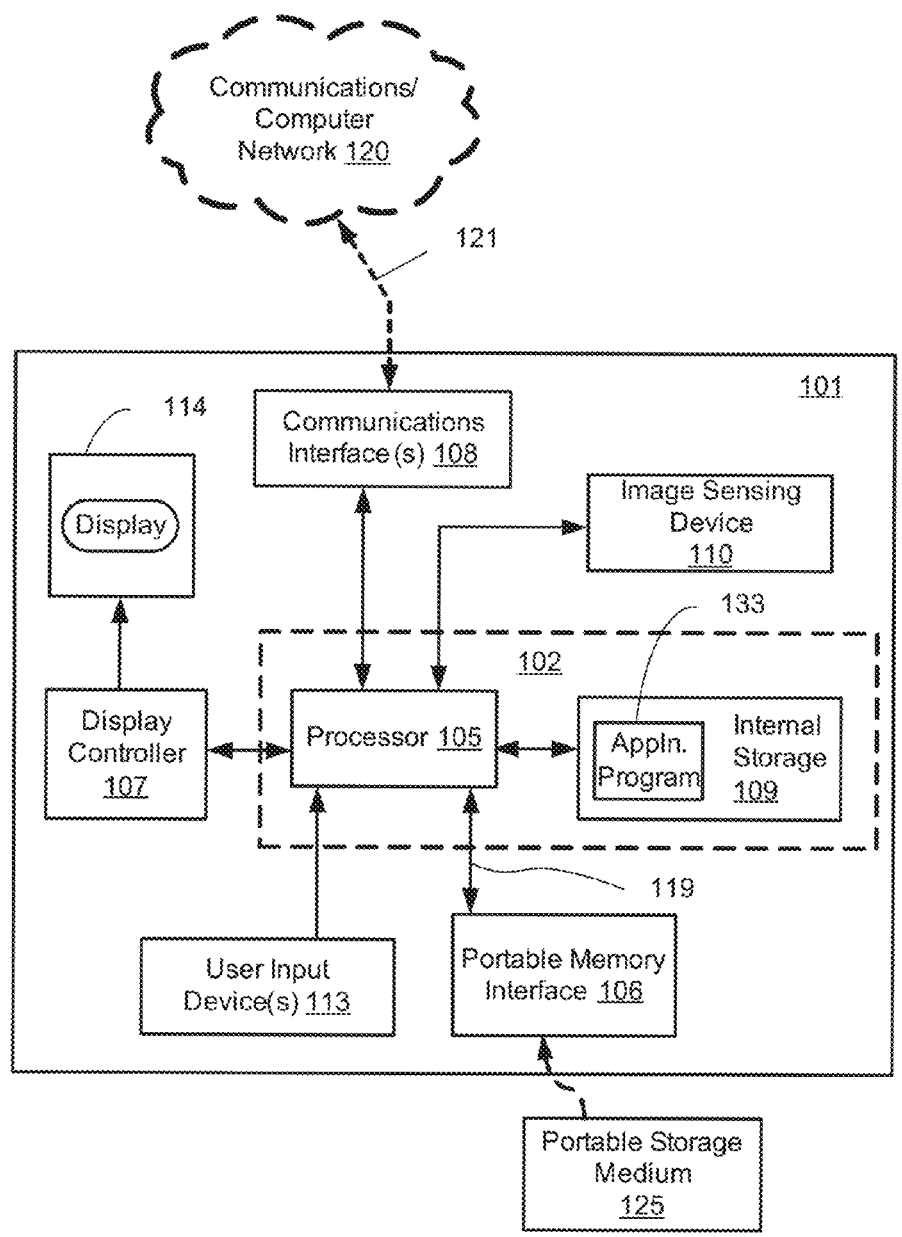
FIGS. 1 and 2 collectively form a schematic block diagram representation of a camera system upon which described arrangements can be practiced.

Where reference is made in any one or more of the accompanying drawings to steps and/or features that have the same reference numerals, those steps and/or features have for the purposes of this description the same function(s) or operation(s), unless the contrary intention appears.

A computer-implemented method, system, and computer program product for updating/modifying a scene model is described below. The updated/modified scene model may then be used in processing of a video sequence comprising a plurality of images.

Figure 2:
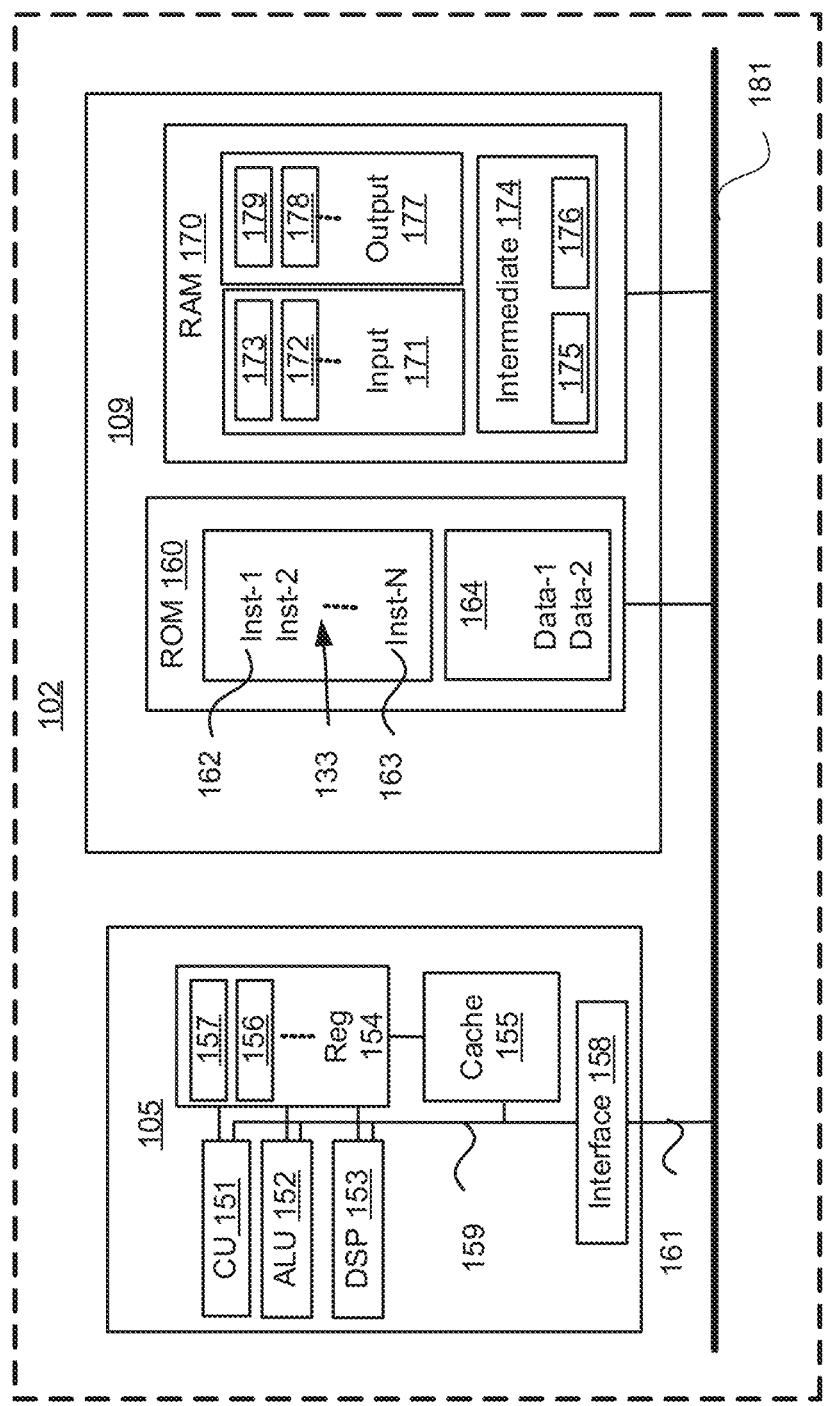

FIGS. 1 and 2 collectively form a schematic block diagram of a camera system 101 including embedded components, upon which foreground/background segmentation methods to be described are desirably practiced. The camera system 101 may be, for example, a digital camera or a mobile phone, in which processing resources are limited. Nevertheless, the methods to be described may also be performed on higher-level devices such as desktop computers, server computers, and other such devices with significantly larger processing resources.

The camera system 101 is used to capture input images representing visual content of a scene appearing in the field of view (FOV) of the camera system 101. Each image captured by the camera system 101 comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

As seen in FIG. 1, the camera system 101 comprises an embedded controller 102. In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2. The RAM 170 may be volatile, non-volatile or a combination of volatile and non-volatile memory.

The camera system 101 includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera system 101 also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1, the camera system 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera system 101 also has a communications interface 108 to permit coupling of the camera system 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with an image sensing device 110, is provided to perform the functions of the camera system 101. The image sensing device 110 may include a lens, a focus control unit and an image sensor. In one arrangement, the sensor is a photo-sensitive sensor array. As another example, the camera system 101 may be a mobile telephone handset. In this instance, the image sensing device 110 may also represent those components required for communications in a cellular telephone environment. The image sensing device 110 may also represent a number of encoders and decoders of a type including Joint Photographic Experts Group (JPEG), (Moving Picture Experts Group) MPEG, MPEG-1 Audio Layer 3 (MP3), and the like. The image sensing device 110 captures an input image and provides the captured image as an input image.

Methods described below may be implemented using the embedded controller 102, where the processes of FIGS. 2 to 17 may be implemented as one or more software application programs 133 executable within the embedded controller 102. The camera system 101 of FIG. 1 implements the described methods. In particular, with reference to FIG. 2, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 (i.e., the ROM 160 has the software 133 stored thereon) can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2 illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

Figure 8:
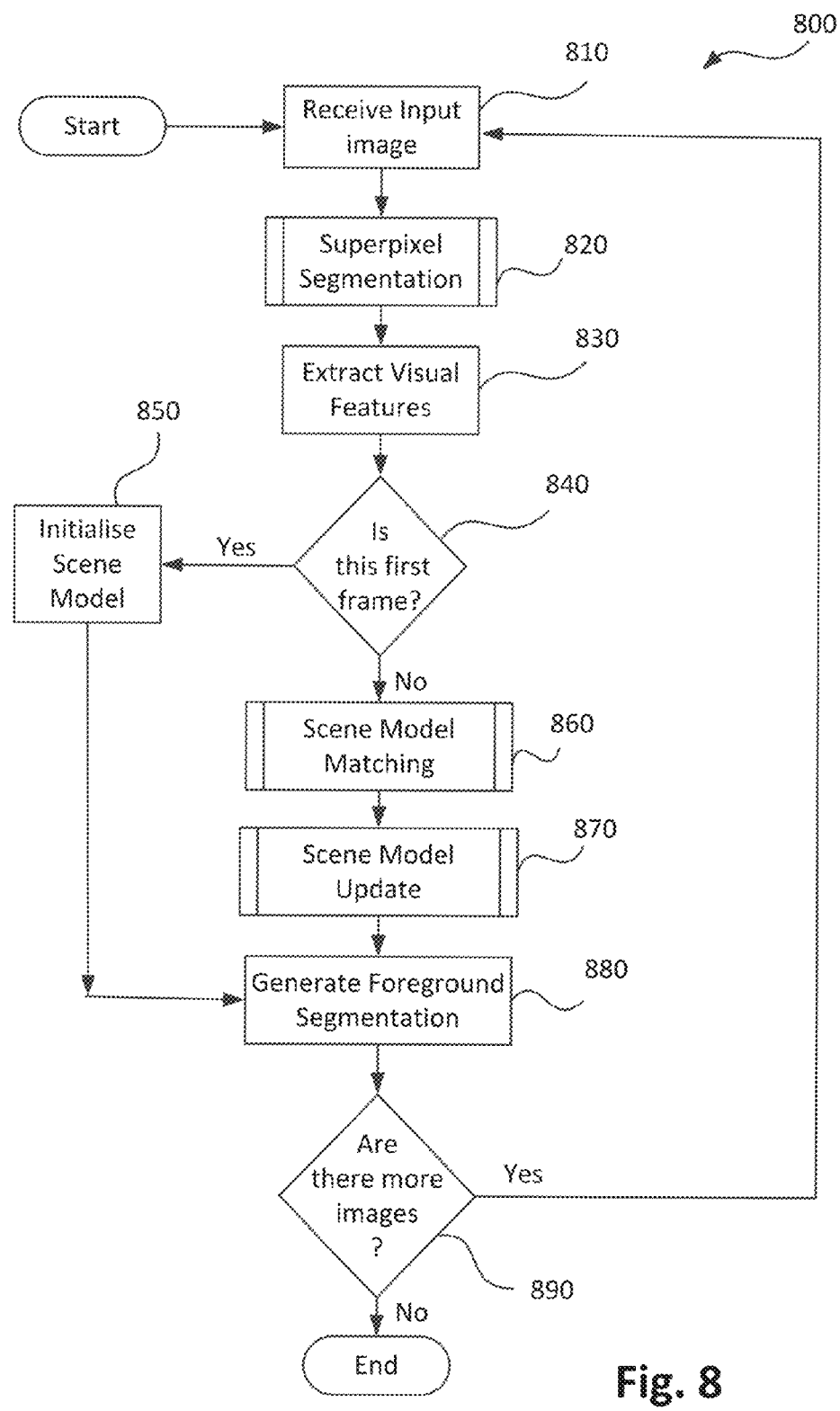
FIG. 8 is a schematic flow diagram showing a method of updating a scene model for foreground segmentation of an image.

A method 800 of updating a scene model for a foreground and background segmentation of an input image captured by the camera system 101 is described below with reference to FIG. 8. The method 800 uses foreground segmentation. The method 800 may be implemented as one or more software code modules of the software application program 133 resident in the storage module 109 and being controlled in its execution by the processor 105. As described below, the scene model is based on superpixel segmentation.

The method 800 performs scene modelling using dynamic visual elements for foreground segmentation of an input image captured by the camera system 101. The term 'dynamic' refers to the property of the visual element that specifies that the group of pixels belonging to a visual element for an input image is decided based on the contents of the input image. That is, the size and shape of a visual element is not pre-decided and depends on the contents of the input image.

The method 800 begins at receiving step 810 where an input image is received from the image sensing device 110 under execution of the processor 105. After receiving the input image, the method 800 moves to step 820. The input image may be stored in RAM 170.

Then at determining step 820, the processor 105 executes a superpixel based image segmentation method on the image received at step 810 to determine dynamic superpixel visual elements for the image. The superpixel segmentation of an image as a visual element segmentation is a type of image over segmentation where salient features, such as pixels sharing similar colour, of a pixel-based representation are preserved.

Figure 3:
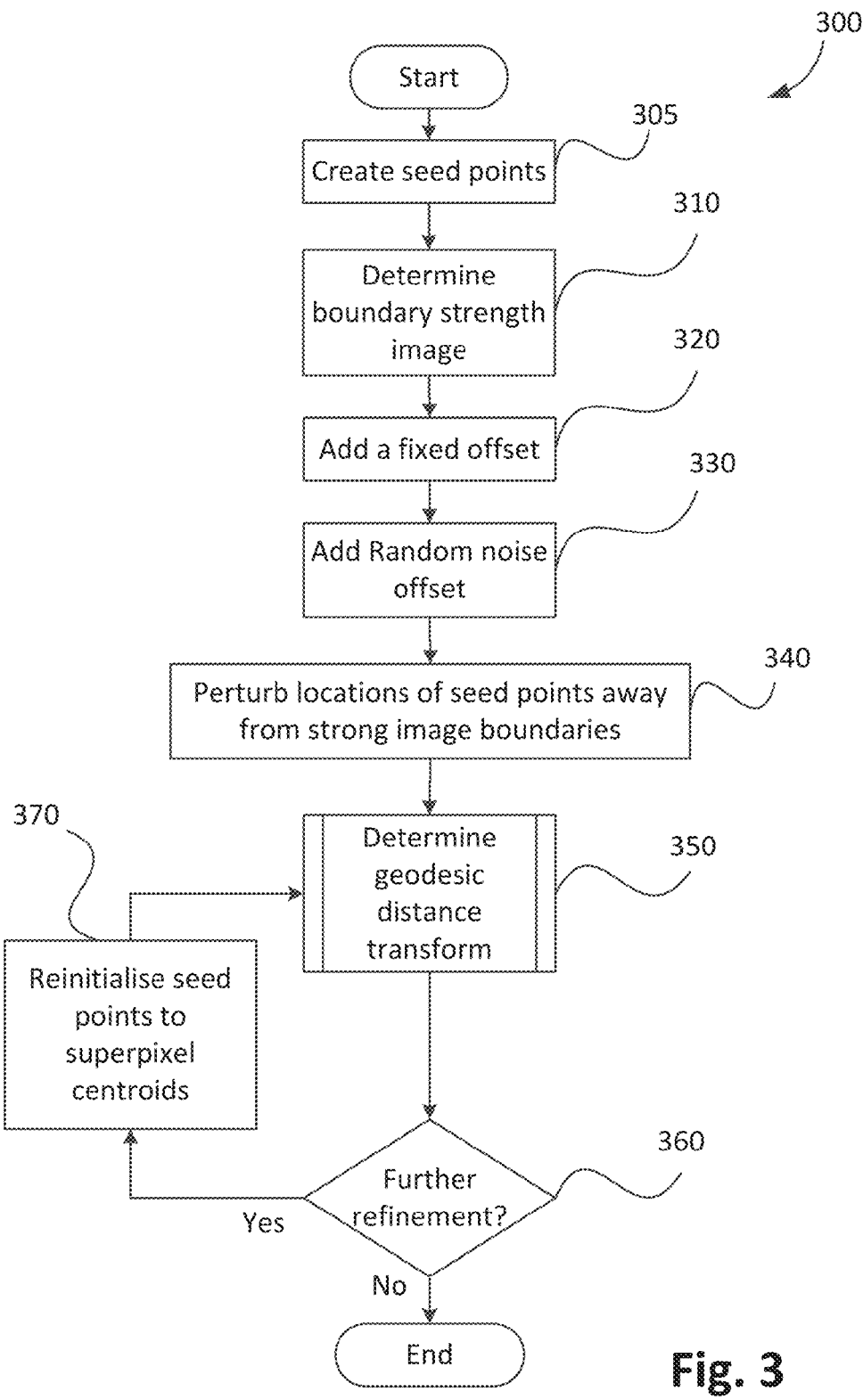
FIG. 3 is a schematic flow diagram showing a method of super pixel segmentation.
Figure 5:
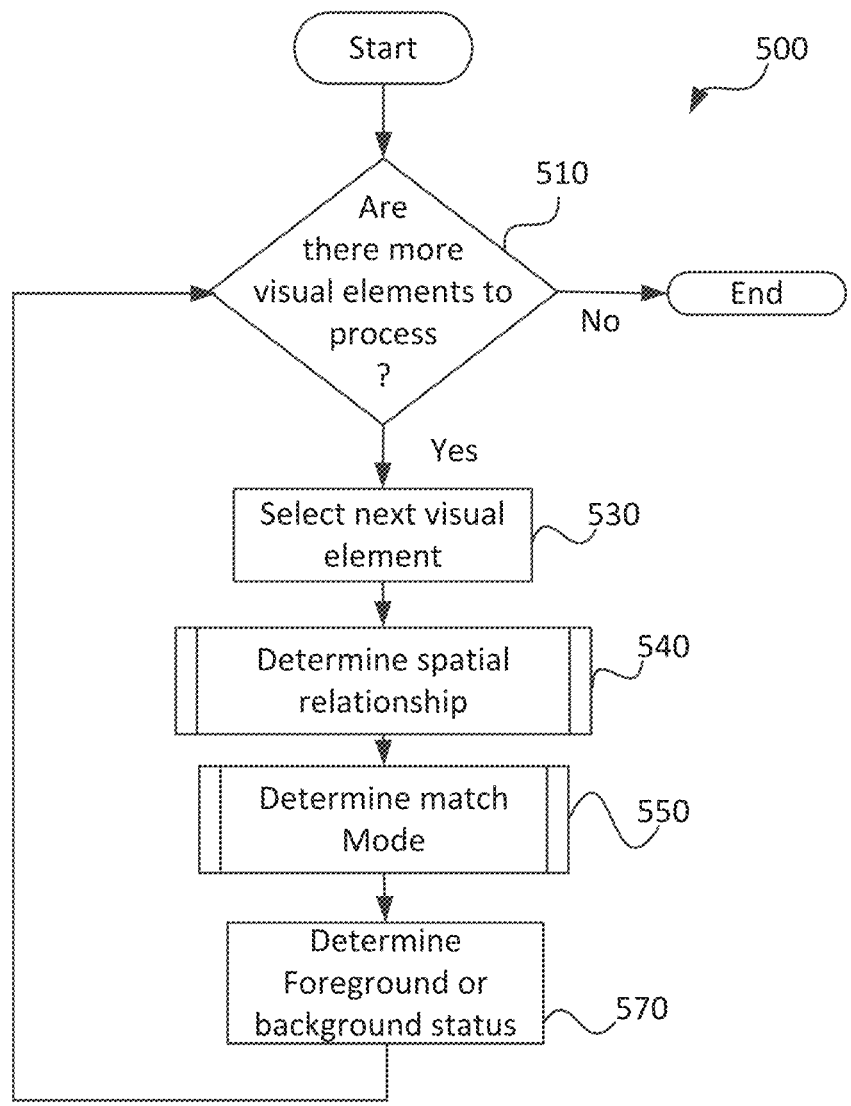
FIG. 5 is a schematic flow diagram of a method of matching a scene model with an image.

FIG. 3 is a flow diagram showing a method 300 of segmenting an input image, as executed at step 820, to produce a predetermined number (e.g., one or more) of superpixel segmentations (or superpixel visual elements) from the input image received at step 810. The method 300 may be implemented as one or more software code modules of the software application program 133 resident in the storage module 109 and being controlled in its execution by the processor 105.

The method 300 begins at creating step 305, where seed points are created under execution of the processor 105. Seed points are locations from where the geodesic transform process is started, as described below in relation to step 350.

The predetermined number of super-pixels (represented as $N_s$) is determined based on image dimension and scene characteristics. For example, in one method, superpixels of approximate size, S, equals eighty (81) pixels are used. For such sized superpixels, seed points are initialised at a square grid at regular grid spacing of nine (9) pixels. The seed points are locations used in step 350 to generate superpixel segments.

Grid based seed points will now be described with reference to FIGS. 7A to 7D.

Figure 7A:
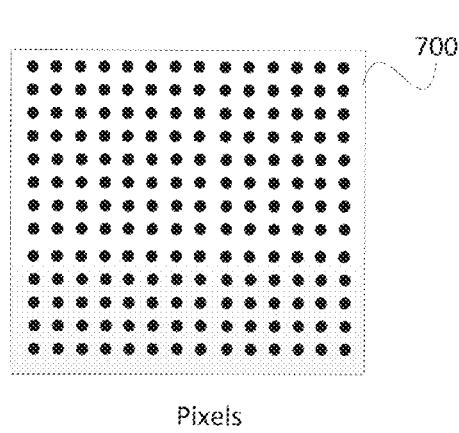
FIG. 7A shows an image with pixels marked as filled circles.
Figure 7B:
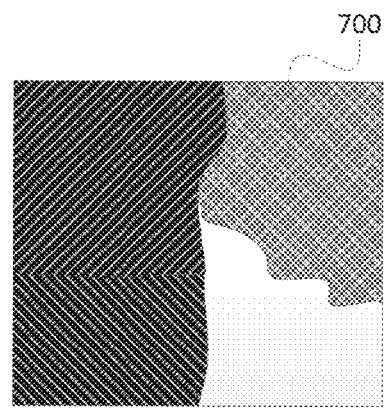
FIG. 7B shows the input image of FIG. 7A.
Figure 7C:
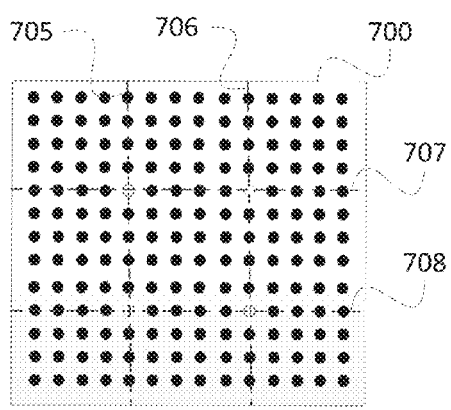
FIG. 7C shows four grid points in the image of FIG. 7A.
Figure 7D:
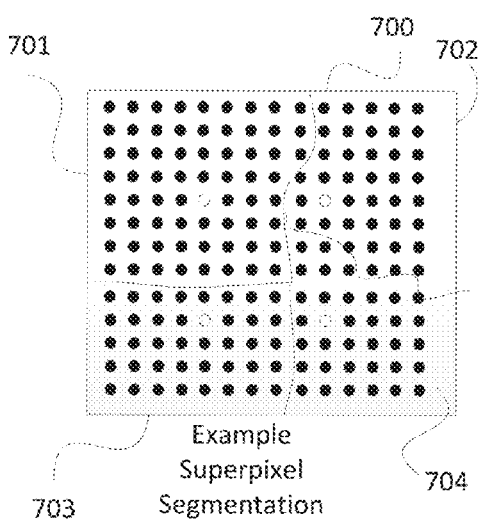
FIG. 7D shows a superpixel segmentation boundary of the image of FIG. 7A.

FIG. 7A shows pixels in an input image 700 as black circles. FIG. 7B shows the input image 100. FIG. 7C shows the image 700 with four (4) grid points as white circles at the intersection of grids 705, 706, 707 and 708. The grids points of FIG. 7C may be used as seed points for superpixel segmentation. FIG. 7D shows the image 700 after a resulting superpixel segmentation which has divided the image into four (4) segments 701, 702, 703, 704.

After creating seed points, the method 300 moves to determining step 310. At step 310, a derived image measuring the strength of scene boundary is determined from the input image received at step 810. In one arrangement, the derived image is an image of local gradient energy of the input image. The gradient energy image is the sum of the gradient energy in two perpendicular directions such as the x- and y-directions. In one arrangement, the gradients along x- and y-directions are computed using Gaussian derivative filters on the input image. The directional Gaussian derivative filters usually have the same scale σ such as σ=1 pixel.

If the input image received at step 810 is a multi-channel image such a Red-Green-Blue (RGB) image from a consumer digital camera, in one arrangement, the gradient energy image is computed as the sum of the gradient energy images from all channels. In another arrangement, if the input image received at step 810 is a multi-channel input image, then the input image is converted to a perceptually linear colour space such as the CIE L*-a*-b* colour space before gradient energy computation to enhance the differences amongst different colours. In another arrangement, the derived image is the local gradient energy raised to a power α, where α>0.5.

The method 300 then proceeds to adding step 320, where a fixed scalar offset is added to the derived image under execution of the processor 105. The value of the fixed constant offset typically depends on the dynamic range of the derived image. In one arrangement, the fixed offset is set to the greater of the median intensity of the derived image, and dynamic range of the derived image times 0.0001. The purpose of the fixed offset addition step is described below with reference to step 350.

Then at adding step 330, a random noise offset, also known as random noise pattern, is added to at least a portion of the derived image under execution of the processor 105. The image portion to which noise is added may be region of constant local intensity in the derived image. The purpose of the noise addition step 330 will be described below with reference to step 340. The magnitude of the added noise is typically small such as to incur an imperceptible change to the derived image. In one arrangement, a Gaussian random noise with zero mean and standard deviation of 0.0001 times the dynamic range of the derived image is used. The random noise may be generated with a pre-determined random seed. In one arrangement, if multiple frames of a video captured by a static camera are segmented sequentially, the same random seed is used to produce coherent noise across multiple frames. The resulting image after noise and offset addition may be referred to as a "boundary cost image".

The method 300 continues at perturbing step 340, where the location of the gridded seed points are perturbed away from strong image boundaries, under execution of the processor 105. The seed perturbation is necessary because seed points located right on top of a strong boundary tend to produce tiny superpixels, whose sizes are proportional to the full-width half-maximum of the cross-section of the boundary edge. The perturbed location of a grid point can be the location of the pixel with minimum boundary measure within a local neighbourhood of the grid point. In one arrangement, the local neighbourhood is a 3×3 pixel window around the grid point.

The method 300 then proceeds to determining step 350, where a geodesic distance transform on a geodesic space defined by the boundary cost image given the local seeds generated in step 340. A geodesic distance between two points is defined as total cost along a geodesic path between the two points, where a geodesic path is the path of minimum integrated cost along the path. If the cost image is constant and positive, the geodesic path between any two points is a straight line. The boundary cost image is usually not flat since there are visual structures in the input image. The geodesic path between two points on a non-flat cost image is therefore not a straight path. The geodesic distance transform of a cost image is the total cost along a minimum cost path from each pixel to a nearest seed in the geodesic space. A by-product of the geodesic distance transform is a nearest seed transform, which associates each pixel in the image with a nearest seed in the geodesic space. That is, the nearest seed transform partitions the set of all pixels in the cost image into groups of connected pixels, each group sharing a common seed point. The pixels associated with a seed point form a connected segment, which forms a superpixel. Hence, the nearest seed transform is a superpixel segmentation from the given seeds.

A chamfer algorithm used to compute a geodesic distance transform from a non-negative boundary cost image f(x,y) and a set of seed points in step 350 will now be described in detail by way of example with reference to FIGS. 4A, 4B, 4C and 4D.

As seen in FIG. 4A, x, 402 and y, 403, are the Cartesian coordinates of a sampled boundary cost image. The chamfer algorithm determines an approximation of the geodesic distance transform by approximating any path between two pixels by a discretised path between the two pixels. A discretised path comprises line segments connecting a pixel with one of eight neighbouring pixels within a 3×3 neighbourhood. A minimum cost path from a pixel to a nearest seed, which is also located at a pixel, therefore goes through a series of pixels along the discretised path. All pixels along the discretised minimum cost path share a common nearest seed. As a result, the nearest seed of a pixel is most of the time also the nearest seed of a neighbouring pixel (except when nearest seed of the pixel is located at the pixel itself). Using the property of common nearest seed amongst neighbouring pixels, the chamfer algorithm tries to propagate the nearest seed and the geodesic distance from one pixel to immediate neighbours of the pixel within a 3×3 neighbourhood.

The chamfer algorithm initially assigns a very large distance (such as infinity) to every pixel in the geodesic distance transform image 401, except at seed points where the distance is zero. The distance transform image is then updated by several scans over the distance transform image and the boundary cost image, each scan propagating the distance from four causal neighbours to a current pixel P.

The direction of the scans alternate between two directions: from top to bottom, left to right as shown in FIG. 4A and from bottom to top, right to left as shown in FIG. 4B. Additional scan directions such as from top to bottom, right to left as shown in FIG. 4C and from bottom to top, left to right as shown in FIG. 4D can also be used.

During each scan, for example the top-down, left-right scan 409 in FIG. 4A, the distance transform $d(x_1,y_1)$ of a current pixel 404 is updated using the distance transform of four causal neighbours of the pixel 404 at location ($x_1-1$, $y_1-1$), 405, at location ($x_1$, $y_1-1$), 406, at location ($x_1+1$, $y_1-1$), 407, and at location ($x_1-1$,$y_1+1$), 408, by the following distance propagation Equation (1), as follows:

$$d(x_1, y_1) = \min \begin{pmatrix} d(x_1-1, y_1-1) + b \cdot f(x_1, y_1), \\ d(x_1, y_1-1) + a \cdot f(x_1, y_1), \\ d(x_1+1, y_1-1) + b \cdot f(x_1, y_1), \\ d(x_1-1, y_1) + a \cdot f(x_1, y_1) \end{pmatrix} \quad (1)$$

where:

(i) a=0.9619 and b=1.3604 are optimal chamfer coefficients for the four (4)-connected neighbours 406, 408 and diagonal neighbours 405, 407, respectively.

(ii) $f(x_1,y_1)$ is the boundary cost at the current pixel ($x_1$, $y_1$).

(iii) The 'min' operator selects the minimum distance amongst the four distances propagated from the four causal neighbours.

The causal neighbour from which the current pixel 404 gets a corresponding minimum geodesic distance from also passes on a nearest seed to the current pixel. Out of bound neighbouring pixels (i.e., neighbouring pixels whose coordinates are outside the coverage area of the input image) are ignored in distance propagation Equation (1).

After a forward pass 409 is performed over the whole distance transform image 401, a backward pass 419 is then applied to the updated distance transform image. In FIG. 4B, the distance transform $d(x_1,y_1)$ of a current pixel 414 is updated using the distance transform of four causal neighbours of the pixel 414 at location ($x_1+1,y_1+1$), 415, at location ($x_1,y_1+1$), 416, at location ($x_1-1,y_1+1$), 417, and at location ($x_1+1,y_1$), 418, in a similar fashion to the forward pass 409 in accordance with Equation (2), as follows:

$$d(x_1, y_1) = \min \begin{pmatrix} d(x_1+1, y_1+1) + b \cdot f(x_1, y_1), \\ d(x_1, y_1+1) + a \cdot f(x_1, y_1), \\ d(x_1-1, y_1+1) + b \cdot f(x_1, y_1), \\ d(x_1+1, y_1) + a \cdot f(x_1, y_1) \end{pmatrix} \quad (2)$$

Similarly, in FIG. 4C, a top-down, right to left scan 429 propagates the distance transform from four causal neighbours of pixel 424 at location ($x_1+1,y_1-1$), 425, at location ($x_1,y_1-1$), 426, at location ($x_1-1,y_1-1$), 427, and at location ($x_1+1,y_1$) 428 to the current pixel 424 at location ($x_1,y_1$) in accordance with Equation (3), as follows:

$$d(x_1, y_1) = \min \begin{pmatrix} d(x_1+1, y_1-1) + b \cdot f(x_1, y_1), \\ d(x_1, y_1-1) + a \cdot f(x_1, y_1), \\ d(x_1-1, y_1-1) + b \cdot f(x_1, y_1), \\ d(x_1+1, y_1) + a \cdot f(x_1, y_1) \end{pmatrix} \quad (3)$$

In FIG. 4D, a bottom-up, left to right scan 439 propagates the distance transform from four causal neighbours at location ($x_1-1,y_1+1$), 435, at location ($x_1,y_1+1$), 436, at location ($x_1+_1,y_1+1$), 437, at location ($x_1-1,y_1$), 438, to the current pixel 434 at location ($x_1,y_1$), in accordance with Equation (4), as follows:

$$d(x_1, y_1) = \min \begin{pmatrix} d(x_1-1, y_1+1) + b \cdot f(x_1, y_1), \\ d(x_1, y_1+1) + a \cdot f(x_1, y_1), \\ d(x_1+1, y_1+1) + b \cdot f(x_1, y_1), \\ d(x_1-1, y_1) + a \cdot f(x_1, y_1) \end{pmatrix} \quad (4)$$

The chamfer geodesic distance transform algorithm requires only a few passes over the boundary cost image. In one arrangement, a forward pass 409 followed by a backward pass 419 followed by another pair of backward 429 and forward 439 passes may be used to produce a non-fragmented nearest seed transform.

The reason for adding a fixed offset to the derived image in step 320 is now described within the framework of a geodesic distance transform in step 350. If the cost image is constant and positive, the geodesic path between any two points is a straight line, which is the shortest path in the Euclidean space. The geodesic distance transform on a flat space is therefore equivalent to the Euclidean distance transform. The nearest seed transform then produces a polygon tessellation of the 2-D image space which is also known as a Voronoi tessellation. The polygon segments of a Voronoi tessellation are called Voronoi cells. Given the same set of seeds, Voronoi tessellation produces the most regular sized and shaped segments that completely cover the 2-D image space. The boundary cost image is usually not flat since there are visual structures in the input image. As a result, the geodesic paths between any two points are usually not straight. The noisier the boundary cost image is, the jaggier the geodesic paths become.

Irregular geodesic paths produce irregular nearest seed transform, therefore irregular superpixel segmentation. To make geodesic superpixels become more regular as the Voronoi cells, the boundary cost image is altered such that geodesic paths become straighter. A constant positive offset added to the boundary cost image make geodesic superpixels more regular as the total cost over any path is now increased by the length of the path times the constant offset. Jaggier paths therefore have a larger total cost than straighter paths. Straighter paths are then more likely to be a minimum cost path, which improves the regularity of the tessellation.

At decision step 360, the processor 105 is used to determine whether or not to perform superpixel refinement by seed re-centroiding followed by another iteration of geodesic distance transform. After step 350, the produced superpixels are already regular due to the placement of seeds at local minima of the boundary cost image and the constant offset added to the boundary cost image as described in steps 340 and 350, respectively. However, depending on the applications, more regular superpixels may be desirable.

One characteristic of a regular-shaped superpixel is that the centroid of the superpixel coincides with the seed of the superpixel, where the centroid of a segment is located at average coordinates of all pixels within the segment. By iteratively re-positioning the seeds to the centroids of previously computed superpixels (rounded to the nearest pixels) and by re-growing the superpixels using a geodesic distance transform, the superpixel segmentation can become even more regular. If the decision is to perform further re-centroidal refinement, then the method 300 proceeds from step 360 to step 370. Otherwise, the method 300 concludes.

In one arrangement, the decision to continue superpixel re-centroidal refinement at step 360 may be predetermined based on a pre-determined number of iterations of steps 350, 360 and 370, (e.g., four (4). The number of iterations is reduced by one every time step 370 is executed. Eventually when the number of iterations reduces to zero, the decision at step 360 will be to exit the loop and the method 300 concludes.

In another arrangement, the decision to perform further superpixel re-centroidal refinement at step 360 is determined automatically by the algorithm after a convergence test. If after seed re-centroiding, the locations of the new seeds do not differ from the locations of old seeds, the iterative seed re-centroiding process of steps 350, 360 and 370 is said to have converged. Once the seed re-centroiding process is converged, the superpixels attain their maximally possible regularity. The decision at step 360 is then to exit the loop and the method 300 concludes.

At step 370, the seed points are reinitialised to the centroids of previously determined superpixels as described above.

Other methods of determining the superpixel segmentations may be executed at step 820, such as Simple Linear Iterative Clustering (SLIC). However, for segmentation of successive frames in a video, and for use with a scene model, regularity in shape is an important characteristic for consistent segmentation over time. The superpixel segmentation used in the method 800 and other methods may determine regularly shaped segments for consistent segmentation.

Returning to the method 800, after step 820, the method 800 progresses to extracting step 830. At extracting step 830, visual features of the dynamic visual elements determined at step 820 are extracted under execution of the processor 105. The dynamic visual elements will be referred to below as "superpixel visual elements". In one arrangement, the input image is in Red, Green, Blue (RGB) colour format so that there are three (3) values representing red, green and blue colour values for each pixel.

In one arrangement, the YCbCr colour domain is used for feature representation at step 830. In a YCbCr colour domain arrangement, the image received at step 810 is converted from RGB to the YCbCr color domain in accordance with Equation (5) as follows:

$$\begin{bmatrix} Y \\ Cb \\ Cr \end{bmatrix} = \begin{bmatrix} 0.299 & 0.587 & 0.114 \\ -0.1687 & -0.3313 & 0.5 \\ 0.5 & -0.4187 & -0.0813 \end{bmatrix} + \begin{bmatrix} 0 \\ 128 \\ 128 \end{bmatrix} \quad (5)$$

Equation (5) may be used for eight (8) bit R, G and B values. To represent visual characteristics of a visual element (i.e. the colour distribution of pixels in a visual element (e.g. R, G and B colour values)), visual features are determined. Let $I \cdot \vec{V}_k$ represent a visual feature vector for a $k^{th}$ visual element of the input image (I) received at step 810. In one arrangement, the mean of colour values of all pixels belonging to a superpixel visual element is used as a visual feature vector in accordance with Equation (6), as follows:

$$I \cdot \vec{V}_k = \{V_1^{input,k}, V_2^{input,k}, V_3^{input,k}\} \quad (6)$$

where, $V_j^{input,k}$ j=1, 2, 3 represents $j^{th}$ visual feature.

$$V_1^{input,k} = \frac{1}{P} \sum_{p \in VE_k} Y_p$$

$$V_2^{input,k} = \frac{1}{P} \sum_{p \in VE_k} Cb_p$$

$$V_3^{input,k} = \frac{1}{P} \sum_{p \in VE_k} Cr_p$$

where, $VE_k$ represents a $k^{th}$ superpixel visual element consisting of P pixels.

In another arrangement, multi-variate Gaussian mixture models are used at step 830 to fit colour values of pixels in a superpixel visual element if the pixel colours do not satisfy a univariate normality test of kurtosis and skewness.

Figure 9:
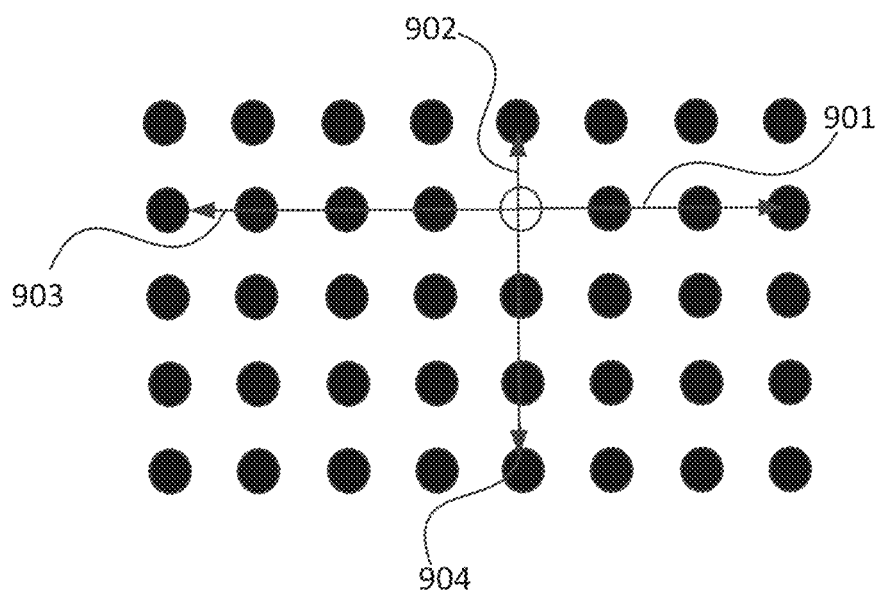
FIG. 9 shows an example of a shape descriptor for a superpixel segment.

In another arrangement, apart from visual colour features, features to describe shape of a superpixel visual element may also be used at step 820. For example, length of a superpixel segment in four (4) directions, 0 degrees, 90 degrees, 180 degrees and 270 degrees from horizontal x-axis, may be represented as shown in FIG. 9 for the superpixel visual element 703 by arrows 901, 902, 903, and 904 respectively. In another arrangement, eight (8) directions may be used at step 830 to represent shape of a superpixel visual element. Shape of a superpixel visual element may also be represented by an ellipse approximation at step 830.

The output of step 830 is a list of visual feature vectors for all superpixel visual elements determined at step 820 for the input image. The list of visual feature vectors may be stored in RAM 170. In one arrangement, the list of visual feature vectors representing the extracted visual features determined at step 820 is arranged in a row-major order arrangement of two dimensional (2D) gridded seed points. For the example input image 700 of FIGS. 7A to 7D, the list visual feature vectors includes superpixel visual element 701 as a first element, visual element 702 as a second element, visual element 703 as a third element and visual element 704 as a fourth element.

After extracting visual features of the input image the method 800 moves to decision step 840. If the input image received at step 810 is a first image (or frame) to be processed, then the method 800 moves to initialising step 850. Otherwise, if the input image is not the first image (frame) to be processed, then the method moves to matching step 860.

Figure 10:
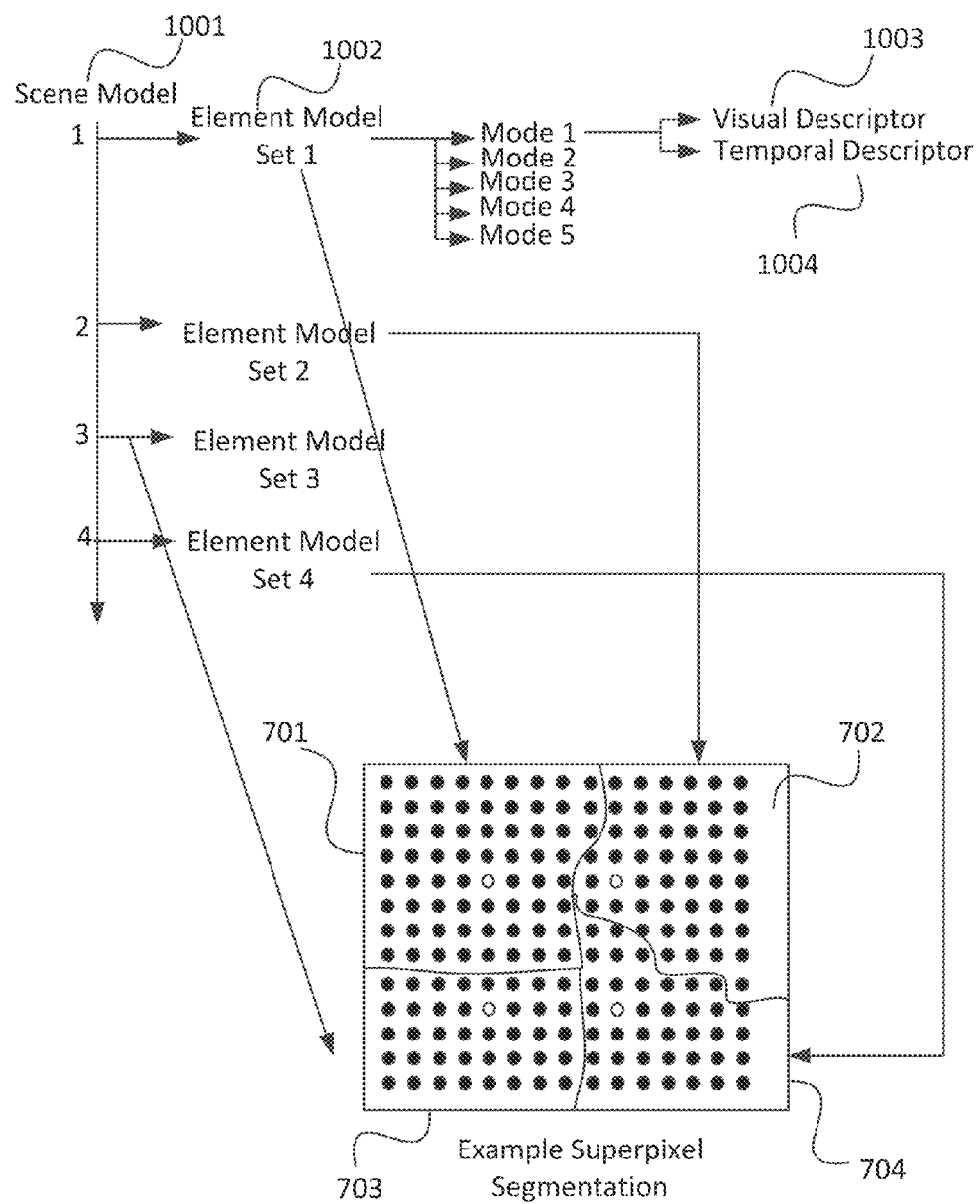
FIG. 10 shows a scene model consisting of element model sets and modes.

If the input image received at step 810 is the first image (frame) to be processed, at step 850, a scene model for the input image is initialised within RAM 170 using the visual features determined at step 830 for the input image. The scene model uses superpixel visual elements as building blocks to represent scene activity. In one arrangement, the number of element model sets in the scene model is initialised to be the same as the total number of superpixel visual elements used to segment the input image. FIG. 10 shows a scene model 1001 containing four (4) element model sets (e.g., 1002). Each list index represents a corresponding superpixel visual element position arranged in the same order as the list of the visual features determined at step 830.

An element model set contains one or more element models. In the example of FIG. 10, the element model set—(e.g., 1002) refers to an adaptive representation of a region. As seen in FIG. 10, the element model set 1002 contains visual information including visual features as well as temporal information about a region surrounding the seed point associated with the list index as shown respectively by visual descriptor 1003 and temporal descriptor 1004. Each of the element model sets (e.g., 1002) is associated with a corresponding seed point. For example, the element model set 1 is associated with a seed of the superpixel visual element 701, the element model set 2 is associated with a seed of the superpixel visual element 702, the element model set 3 is associated with a seed of the superpixel visual element 703, and the element model set 4 is associated with a seed of the superpixel visual element 704.

Each element model of an element model set may be referred to as a "mode" or "mode model". For ease of explanation, each element model of an element model set will be referred to below as a mode. The number of modes in an element model set depends on scene characteristics. In a scene with lots of activities and changing background, more modes are required for scene modelling. In one arrangement, a maximum of five (5) modes is used for each element model set (e.g., 1002). For a given image (e.g., as indicated by a frame number), one or more modes may be active. As part of a scene model update performed at step 870, as described below, scene model management is performed when all modes are active and a new mode needs to be created.

The temporal descriptor 1004 contains temporal information related to the element model set 1002. In one example arrangement, the temporal information includes:

(i) Cf: when the mode was created,
(ii) Lmf: when the mode was matched with an input visual element in an input image last,
(iii) Mc: how many times the mode has been matched with an input visual element in an input image,
(iv) Df: frame number when the model is marked for deletion.

A mode is either a foreground mode or a background mode at a point in time. A mode which is a foreground mode may become a background mode over time.

The scene model (e.g., 1001) is initialised at step 850 using the visual features. One mode for each superpixel visual element model is set using corresponding visual features of the input image. For example, the visual descriptor of "Mode 1" of Element Model Set 1002 is set to the visual features of superpixel visual element 701. The temporal features of Mode 1 are initially set as follows:

$Cf=1$ $Lmf=1$ $Mc=1$

Frame number Df for deletion of a mode is determined as a function of match counts Mc and last match frame Lmf. In one arrangement, the Frame number Df may be determined in accordance with Equation (7), as follows:

$$Df=Lmf+A*Mc+B \quad (7)$$

where, A and B are pre-defined user parameters. In one arrangement, A=16 and B=30 images (frames) for video sequences captured at ten (10) images (frames) per second. Using the above expression, Df=47 images (frames) is set during scene initialisation.

The temporal features for all other modes are initially set to zero to signal that other modes are inactive. Inactive modes do not contain scene related information.

The other element model sets (i.e., Element Model Set 2, Element Model Set 3, and Element Model Set 4) are also initialised in the same manner. After finishing the scene model initialisation, the method 800 moves to matching step 860.

At matching step 860, the input image is matched to the scene model configured within RAM 170 and foreground/background status of the superpixel visual elements of the input image is determined. A method 500 of matching a scene model to an image, as executed at step 860, will now be described with reference to FIG. 5. The method 500 may be implemented as one or more software code modules of the software application program 133 resident in the storage module 109 and being controlled in its execution by the processor 105.

The method 500 begins at a first decision step 510, where the processor 105 is used to check if all the input superpixel visual elements of the input image have been compared to the scene model. If all input superpixel visual elements have been compared to the scene model, then the method 500 concludes. Otherwise, the method 500 proceeds to step 530.

Then at selecting step 530, under execution of the processor 105, a next input superpixel visual element is selected from the list of superpixel visual elements generated at step 830.

The method 500 then continues to determining step 540, where the spatial relationship between at least the input superpixel visual element selected at step 530 and element model sets of the scene model for the input image is determined under execution of the processor 105. At step 540, the processor 105 is used to select a set of seed points whose corresponding element model sets will be used to compare to the superpixel visual element selected at step 530. The spatial relationship is determined at step 540 using the seed points selected in accordance with the method 1100.

A method 1100 of selecting a seed point, as executed at step 540, will be described below with reference to FIG. 11. The method 1100 may be implemented as one or more software code modules of the software application program 133 resident in the storage module 109 and being controlled in its execution by the processor 105.

The method 1100 begins at determining step 1101, where the centroid of the superpixel visual element selected at step 530 is determined under execution of the processor 105. Then the method 1100 continues to determining step 1102, where the processor 105 is used to determine a number of seed points in the selected visual element. There are two possible cases which are checked at decision step 1103, as follows:

1. There are one or more seed points which lie inside the selected superpixel visual element in the input image received at step 810.

2. There are no seed points which lie inside the selected superpixel visual element in the input image received at step 810.

If the number of seed points lying inside the selected superpixel visual element is zero, then the method 1100 proceeds to selecting step 1104. Otherwise, the method 1100 proceeds to selecting step 1106. At step 1104, the processor 105 is used for selecting the nearest seed point in a neighbourhood outside the selected superpixel visual element to access the associated element model sets. In one arrangement, at step 1104, all visual elements surrounding the input superpixel visual element to be checked are used to select a nearest seed point in each of the visual elements neighbouring the selected visual element. In another arrangement, a plurality of seed points (e.g., all seed points) in the visual elements neighbouring the selected visual element are selected at step 1104.

Following step 1104, the method 1100 proceeds to step storing step 1105, where the seed points selected at step 1104 are stored in RAM 170 for use in the method 500.

As described above, if the number of seed points lying inside the selected superpixel visual element is non-zero at step 1103, then the method 1100 continues to selecting step 1106. As step 1106, the nearest seed point to the centroid of the selected superpixel visual element is selected to access the associated element model sets of the scene model for the input image. In another arrangement, a plurality of seed points (e.g., all seed points) which lie within the superpixel visual element are selected at step 1106 to access associated element model sets.

The method 1100 then proceeds to storing step 1107 where the seed points selected at step 1106 are stored in RAM 170 for use in the method 500.

The determination of the spatial relationship between the input superpixel visual element selected at step 530 and element model sets of the scene model, as executed at step 540, will now be further described with reference to FIG. 14 and FIG. 15.

Figure 14A:
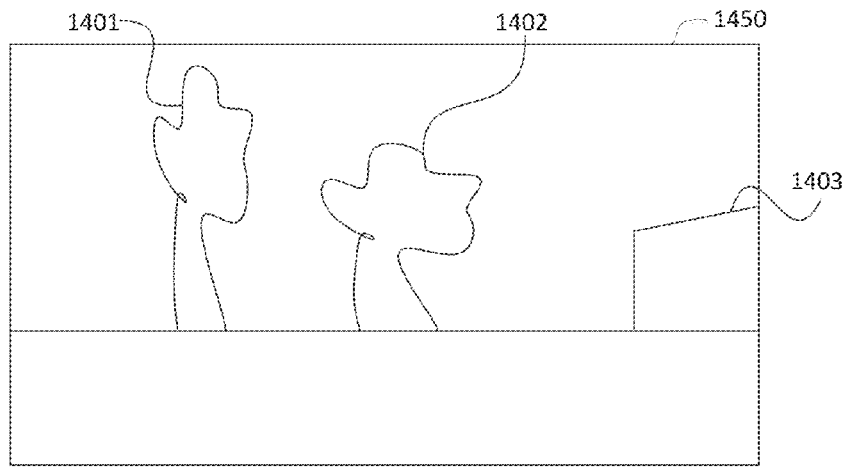
FIG. 14A shows an example of an input image.

FIG. 14A shows an example of a first image (frame) 1450 of a scene, as an input image in a video sequence, where the image 1450 has three (3) structures 1401, 1402 and 1403. In the example of FIG. 14A the image 1450 is received at step 810 and processed in accordance with the method 1100.

Figure 14B:
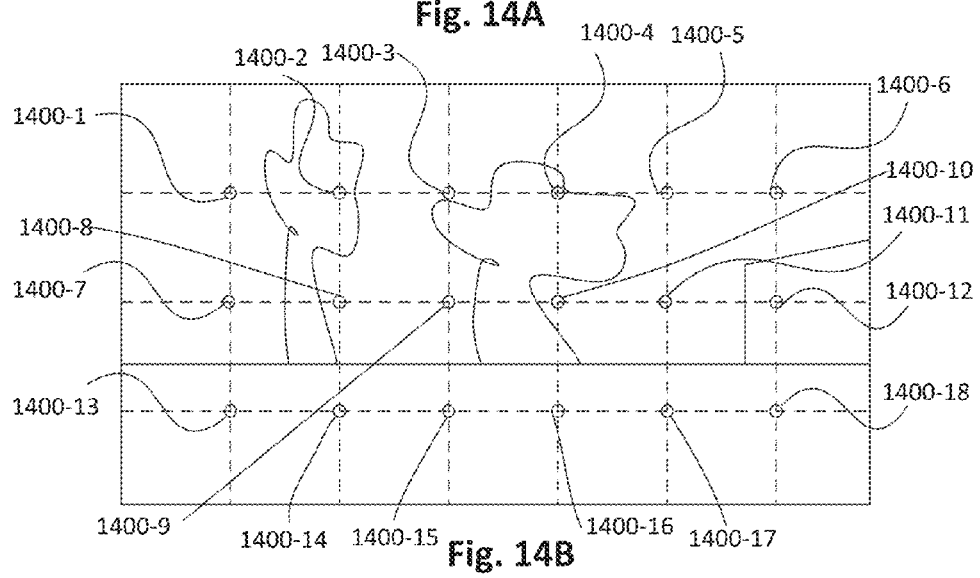
FIG. 14B shows location of grids and grid based seed points.

FIG. 14B shows grid points and grid based seed points determined for the example image 1450. In the example of FIG. 14B, there are a total of eighteen (18) seed points marked from 1400-1 to 1400-18 in row-major order. As seen in FIG. 14B, seed points 1 to 18 are marked as 1400-1 to 1400-18. The seed points 1400-1 to 1400-18 are initial points determined using method 300 described in FIG. 3.

Figure 14C:
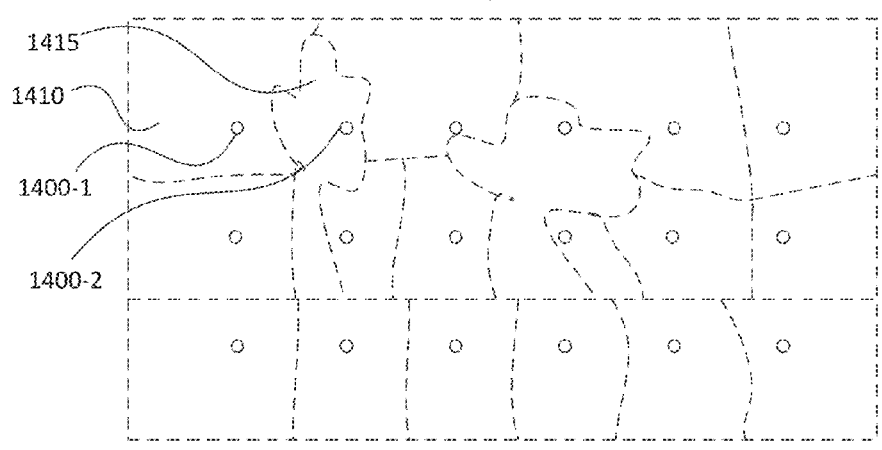
FIG. 14C shows superpixel segmentation of the input image.

FIG. 14C shows a possible superpixel segmentation of the example image 1450 (as determined at step 820) which is used to initialise the scene model for the image 1450 (as at step 850). For example, segment 1410 represents a superpixel visual element corresponding to seed 1400-1, segment 1415 represents a superpixel visual element corresponding to seed 1400-2 and so on. The initialised scene model for the example image 1450 will have eighteen (18) visual element model sets (i.e., visual element model set one (1) to visual element model set eighteen (18)) where each visual element model is initialised using characteristics from a corresponding superpixel visual element as described in step 850. For example, in the example of FIG. 14C, visual element model 1 is initialised using visual characteristics of superpixel visual element 1410.

Figure 15A:
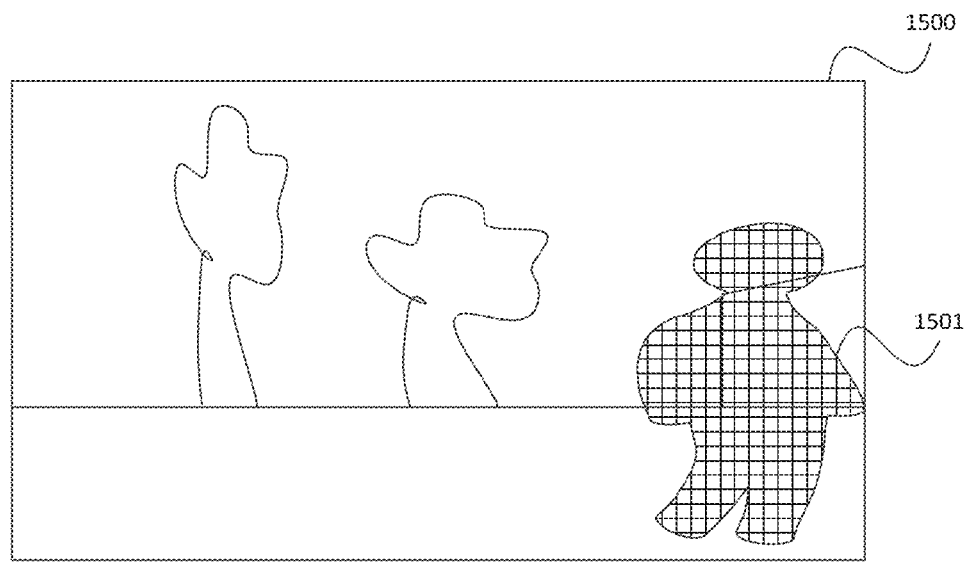
FIG. 15A shows an input image.
Figure 15B:
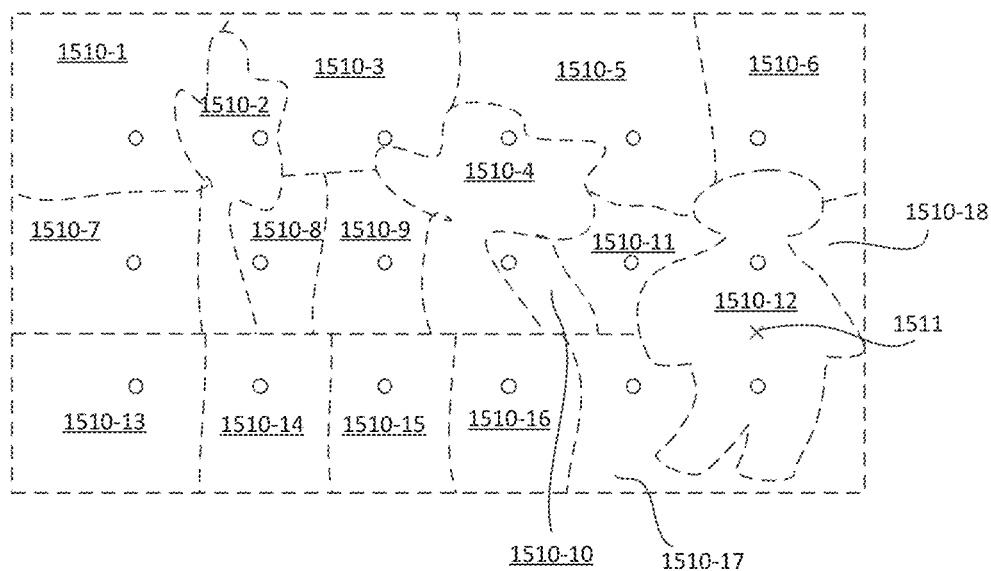
FIG. 15B shows a superpixel segmentation of the input image of FIG. 15A.
Figure 16:
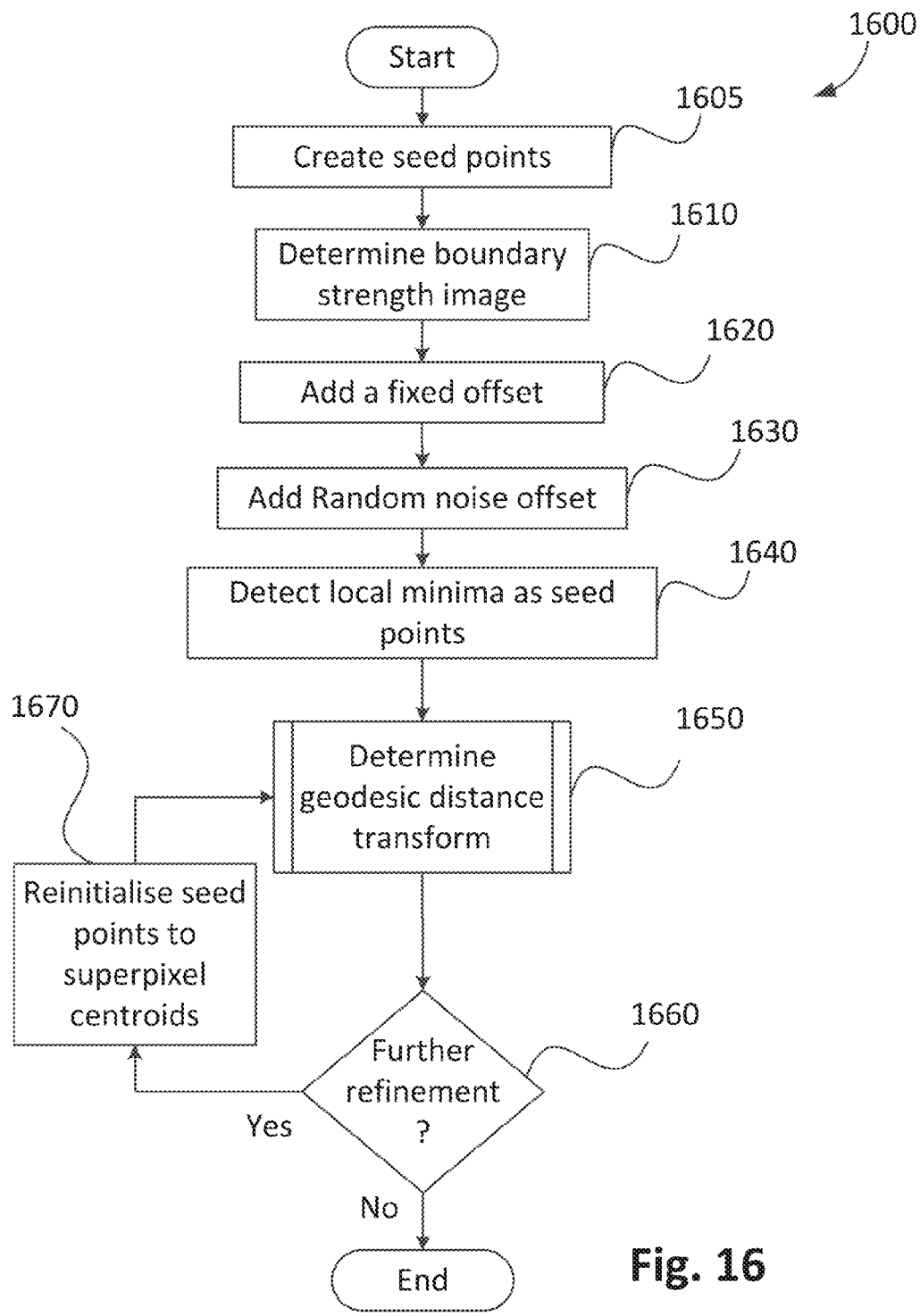
FIG. 16 is a schematic flow diagram showing a method of segmenting an input image using non-grid superpixel segmentation.

FIG. 15A shows a second image (frame) 1500 as an input image of the scene in the video sequence of FIG. 14A. The image 1500 comprises an object 1501 in the scene. In the example of FIG. 15A, the second image (frame) 1500 is captured after the first image (frame) 1450. FIG. 15B shows a possible superpixel segmentation of the image 1500 shown in FIG. 15A (as determined at step 820). The superpixel visual elements in the image 1500 are marked from 1510-1 to 1510-18. In the image 1500, there are two types of superpixel visual elements:

1. Superpixel visual elements which have non-zero seed points which lie inside the visual element: The visual elements 1510-1, 1510-2, 1510-3, 1510-4, 1510-5, 1510-6, 1510-7, 1510-8, 1510-9, 1510-10, 1510-11,1510-13, 1510-14,1510-15, 1510-16, 1510-17 and 1510-12 have one (1) or more seed points which lie within the superpixel visual element.

2. Superpixel visual elements which have zero (0) seed points which lie inside the visual element: The visual element 1510-18 has zero seed points.

Figure 11:
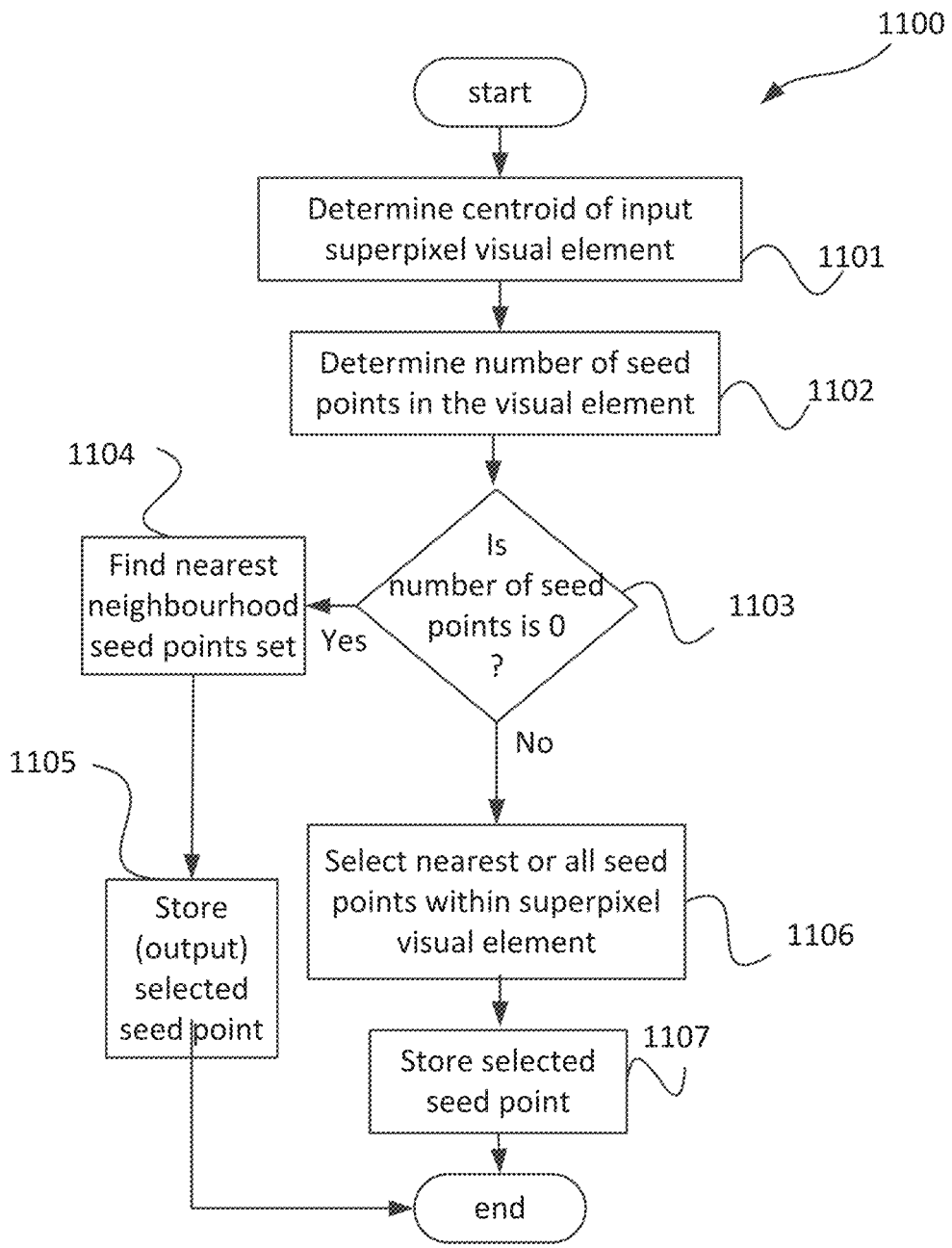
FIG. 11 is a schematic flow diagram showing a method of selecting a seed point.
Figure 12:
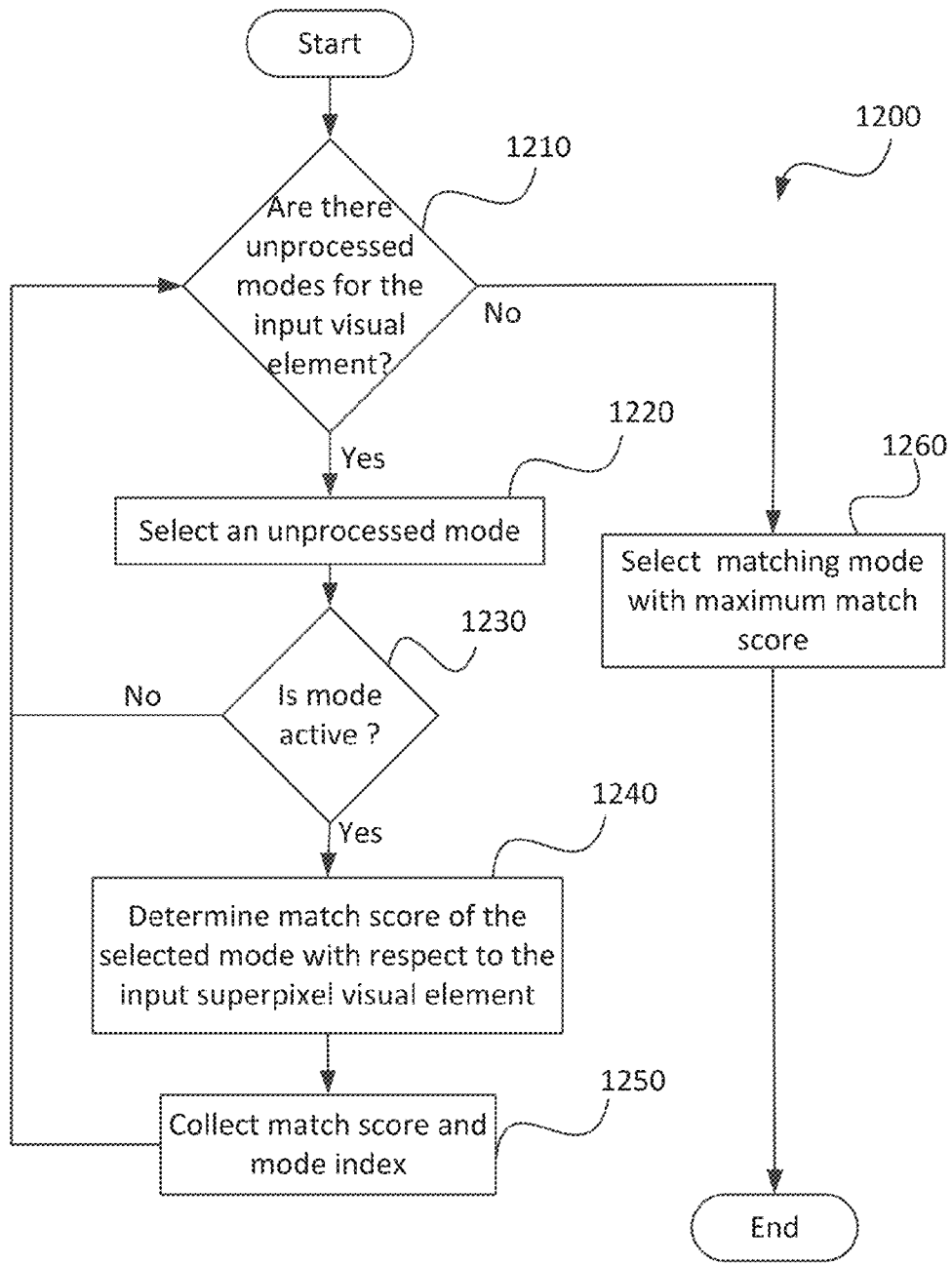
FIG. 12 is schematic flow diagram showing a method of determining a matching mode for an input superpixel visual element as executed in the method of FIG. 5.

A spatial relationship may be determined for scene model matching for the input image 1500 in FIG. 15B, according to method 1100 described in FIG. 11. A spatial relationship is determined with respect to the scene model initialised at step 850, using the image 1450 shown in FIG. 14C.

In one arrangement, for a superpixel visual element in the input image 1500, all visual element model sets corresponding to the seed points which lie within the superpixel visual element are selected in the method 1100. For example, for superpixel visual element 1510-1, visual element model set 1 corresponding to seed point 1400-1 is selected. Similarly, for superpixel visual elements 1510-2, 1510-3, 1510-4, 1510-5, 1510-6, 1510-7, 1510-8, 1510-9, 1510-10, 1510-11, 1510-13, 1510-14, 1510-15, 1510-16 and 1510-17, visual element model set two (2), three (3), four (4), five (5), six (6), seven (7), eight (8), nine (9), ten (10), eleven (11), thirteen (13), fourteen (14), fifteen (15), sixteen (16) and seventeen (17) are respectively selected. For superpixel visual element 1510-12, there are two (2) seed points 1400-12, 1400-18, which lie inside the superpixel visual element 1510-12. Thus, superpixel visual element model sets corresponding to both seed points 1510-12 and 1510-18 are selected for matching.

The superpixel visual element 1510-18 does not have any seed points which lie within the superpixel visual element 1510-18. In the example of element 1510-18, all neighbouring superpixel visual elements are identified firstly by boundary pixel analysis for all boundary pixels of the superpixel visual element 1510-17 and by identifying superpixel visual elements of eight (8)-connected neighbouring pixels of the boundary pixels. As shown in the FIG. 15B, superpixel visual elements 1510-12, 1510-6, and 1510-17 are determined as neighbouring superpixel visual elements. The seeds points which lie in the neighbouring superpixel visual elements are seed points 1400-6, 1400-12, 1400-17, and 1400-18. The visual element model sets corresponding to the seed points 1400-6, 1400-12, 1400-17 and 1400-18 which lie within the neighbouring superpixel visual elements are selected for matching in the method 1100.

In another arrangement, a centroid of a superpixel visual element is firstly selected by using x and y locations of all pixels which lie within the superpixel visual element. For example, FIG. 5B shows the centroid 1511 of the superpixel visual element 1510-12. The seed point which is nearest to the centroid 1511 is identified. In one arrangement, the nearest seed point to the centroid 1511 is determined using Euclidean distance formulation. In another arrangement, the nearest seed point to the centroid 1511 is determined using sum of absolute difference distance formulation. In one example shown in FIG. 15B, seed point 1400-12 is the closest seed point to centroid 1511 using Euclidean distance formulation. Thus, the visual element model set twelve (12) is selected for scene model matching.

The set of seed points at either of steps 1104 or 1106 (i.e., depending on step 1103) are used to access all associated element model sets from the scene model for matching. The output of spatial relationship matching as executed at step 540 is the set of element model sets associated with the selected seed points (i.e., the seed points selected at either of steps 1104 or 1106).

The method 500 proceeds from step 540 to step determining step 550, where all modes in the set of element model sets of the scene model are used to compare the superpixel visual element selected at step 530 to determine a best matched mode. The input to the step 550 is a set of element model sets of the scene model for the input image. Each element model set consists of multiple modes (e.g., Element Model Set 1 consists of Modes 1 to 5 as seen in FIG. 10). A method 1200 of determining a best matching mode, as executed at step 550, will now be described with reference to FIG. 12. In the method 1200, the input modes are compared to the superpixel visual element selected at step 530.

The method 1200 may be implemented as one or more software code modules of the software application program 133 resident in the storage module 109 and being controlled in its execution by the processor 105. The method 1200 is used to determine the best matching mode that matches the superpixel visual element selected at step 530 in the input image received at step 810.

The method 1200 begins at a first decision step 1210, where the processor 105 is used to check if all the modes in the set of element models associated with a selected seed point (i.e., a seed point selected at step 1104 or 1106) have been compared to the input superpixel visual element in the input image (i.e., Are there unprocessed modes for the input visual element?). If all of the modes have been compared to the input visual element, then the method 1200 continues to the select best matching mode step 1260.

If there are remaining modes to be compared, then the method 1200 continues on to selecting step 1220 where an unprocessed mode is selected under execution of the processor 10.

Then at a second decision step 1230, if the selected mode is active, based on temporal information in a temporal descriptor such as descriptor 1003. The selected mode is deleted if the current frame number of the input image is greater than the frame number for deletion Df. If the selected mode is not active and deleted, the method 1200 returns to step 1210 via NO arrow. If the selected mode is active, then the method 1200 continues to determining step 1240 via YES arrow.

At step 1240, a match score between the visual descriptor of the selected mode and a visual feature of the input superpixel visual element is determined under execution of the processor 105. A high match score signifies that the superpixel input visual element and the mode are a match and probably belong to a same physical entity in the scene.

In one arrangement, the match score is determined at step 1240 via probabilistic modelling of two class classification, the match and non-match class, using an absolute difference between the visual descriptors of the mode and the input superpixel visual features. In such an arrangement using the absolute difference, the match score lies between zero (0) and one (1) where zero (0) represents no-match and one (1) represents a perfect match. In one arrangement, the match class is modelled as a Gaussian model while the non-match is modelled as a uniform distribution. In another model, a probabilistic support vector machine (SVM) classifier is used for match/non-match classification. The method 1200 continues at collecting step 1250, where the processor 105 is used to collect an index number of the matched mode and corresponding match score in an array, configured within RAM 170 to be used in step 1260.

After step 1250, the method 1200 continues to decision step 1210. If there are no remaining unprocessed modes, then the method 1200 takes the NO arrow to selecting step 1260. At step 1260, the mode with the best match score is selected under execution of the processor 105 and stored in the RAM 170. The output of method 1200 executed at step 550 is the best matched mode among the input set of modes for the input visual element.

After determining the best match mode, the method 500 (i.e., as executed at step 860 in FIG. 8) continues from the step 550 to the status determining step 570. At step 570 the foreground/background status of the visual element selected at step 530 is determined under execution of the processor 105. At step 570, the processor 105 is firstly used to determine whether the best match mode having the highest match score is a good enough match or not by comparing the match score with a pre-determined threshold value which is referred to below as the "sensitivity level".

If the match score is determined to be lower than the sensitivity level at step 570, then a new mode creation event is created and the selected superpixel visual element is classified as Foreground. The new mode creation event will be used for scene model update in step 870.

The sensitivity level defines how different an input visual element needs to be, compared to existing element models to create a new element model. The sensitivity level may be selected based on machine learning from sample data. In one arrangement, the sensitivity level is 0.5.

The sensitivity level can be said to control how often new modes are created. A low sensitivity level results in fewer new modes being created, and therefore more matches to existing modes. With a lower sensitivity level there will be more matches to background modes as fewer foreground modes will be created, and thus fewer matched foreground modes will be determined. A high sensitivity level will result in more new modes being created, and therefore fewer matches to existing modes. As new modes are initially foreground modes, with a high sensitivity level more matched foreground modes and more newly created foreground modes are determined If the match score is higher than the sensitivity level, the temporal characteristics of the corresponding matching mode are used to determine foreground/background status of the selected superpixel visual element. In one arrangement, age of the mode $a_m$ is calculated at step 570 in accordance with Equation (8) as follows:

$$a_m = \text{current frame number} - \text{creation frame} \quad (8)$$

The age of the mode $a_m$ is compared with a pre-determined threshold $(a_{th})$. If $a_m < a_{th}$, the selected superpixel visual element is classified as foreground else background. In one arrangement, $a_{th}$ is calculated in accordance with Equation (9) as follows:

$$a_{th} = \max(\text{floor}(C_{th}^* \ (\text{current frame number}-1)), a_{th\text{-}max}) \quad (9)$$

where $C_{th}$ is a number between zero (0) and one (1) and floor( ) represents a mathematical floor function which rounds the input number to the nearest integer towards minus infinity; and $a_{th\text{-}max}$ represents maximum value of age threshold. A lower value of $C_{th}$ represents that new observations are turned background faster. In one arrangement, $C_{th} = 0.8$ is used.

Accordingly, the outputs of step 570 are (i) the input superpixel visual element foreground/background status; and (ii) Information about the match mode and whether a new mode needs to be created or not.

After step 570, the method 500 continues to the decision step 510 which checks if there are more input superpixel visual elements to process. If all input superpixel visual elements have been processed, then the method 500 concludes.

After step 860, the method 800 continues to updating step 870, where the processor 105 is used for updating the scene model for foreground segmentation of the input image received at step 810, which is captured by the camera system 101 based on scene model matching results from step 860. The scene model is updated for a foreground segmentation of the image captured by camera system 101 based on the spatial relationship determined at step 860.

Figure 6:
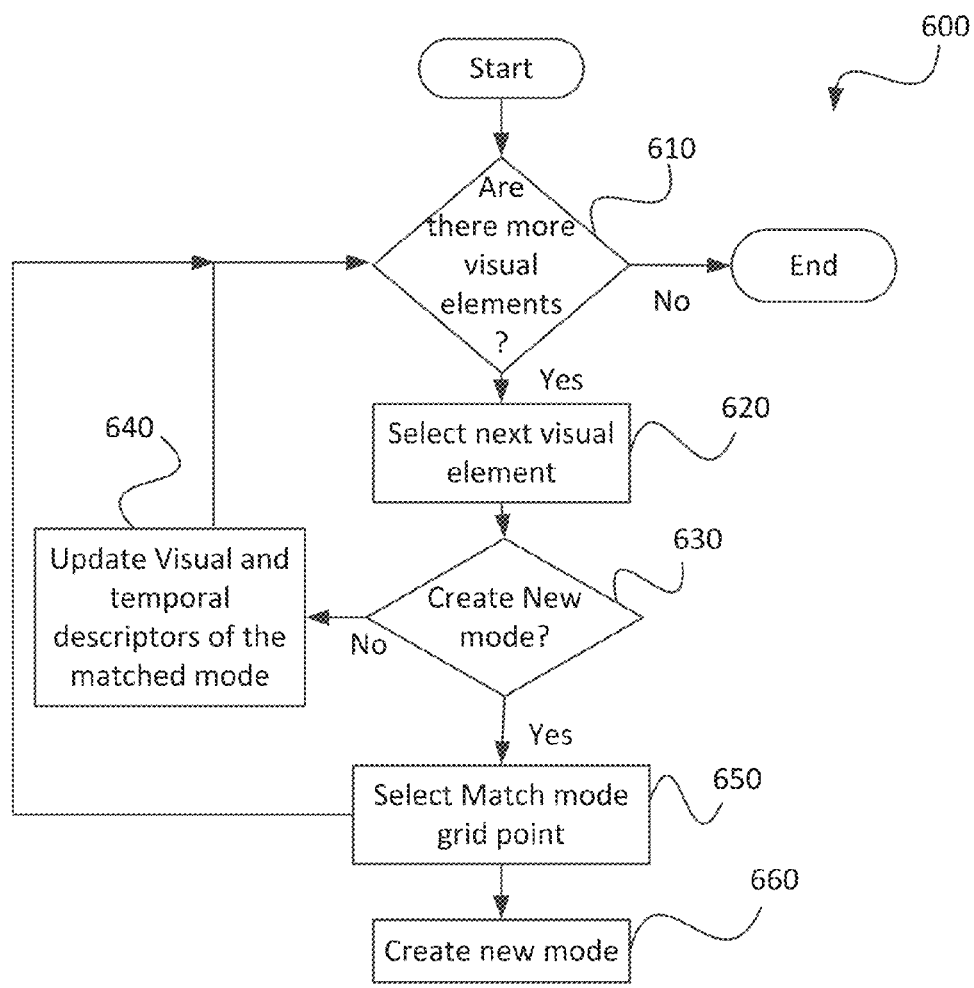
FIG. 6 is a schematic flow diagram showing a method of a updating a scene model.

A method 600 of updating a scene model, as executed at step 870, will now be described with reference to FIG. 6. The method 600 may be implemented as one or more software code modules of the software application program 133 resident in the storage module 109 and being controlled in its execution by the processor 105.

The method 600 updates the scene model for each superpixel visual element of the input image received at step 810, which is captured by the camera system 101. The method 600 begins at decision step 610, where if there are input superpixel visual elements of the input image remaining to be processed, then the method 600 proceeds to selecting step 620 via the YES arrow. Otherwise, the method 600 concludes.

At step 620, a superpixel visual element of the input image which has not been processed for scene model update is selected under execution of the processor 105.

After selecting an input superpixel visual element at step 620, the method 600 proceeds to decision step 630. If it is determined, under execution of the processor 105, that a new mode needs to be created based on scene model matching results from step 860, for the selected input superpixel visual element, then the method 600 continues to step 650 via the YES arrow. Otherwise, the method 600 proceeds to step 640.

To create a new mode, one or more seed points are selected to identify corresponding element model sets in the scene model. In one arrangement, the seed point associated with the element model including modes which is matched with the input superpixel visual element is selected at step 650. A new mode is created based on the input superpixel visual element and associated with the selected seed point as one mode in a corresponding visual element model set. Accordingly, a new mode is created at each seed point selected for scene matching. For example, when a new mode is created for the input superpixel visual element 1510-12, the new mode is associated with both seed points 1400-12 and 1400-18. After selecting one or more seed points at step 650, the method 600 proceeds to creating step 660.

The creation of a new mode at a seed point at step 660 will now be described. Firstly, it is determined if an inactive mode exists in the element model set corresponding to the input superpixel visual element selected at step 620. If an inactive mode exists, a new mode is created by using the visual features of the selected superpixel visual element and a temporal descriptor of the newly created mode is initialised as described above in the scene model initialisation step 850. If all modes of the element model set corresponding to the superpixel visual element selected at step 620 are active, then a mode is selected for deletion. In one arrangement, the mode which is marked for earliest deletion based on temporal descriptor Df is selected at step 660 and initialised using the visual features of the superpixel visual element selected at step 620. New modes are created at all seed points selected at step 650.

After step 660, the method 600 continues to decision step 610 to check if there more visual elements to be processed. If all input visual elements have been processed, the method 600 ends.

If it is determined at step 630 that a new mode is not required to be created, then the method 600 continues to update step 640 via the NO arrow. At step 640, the visual and temporal descriptor of the matching mode determined at step 550 are updated under execution of the processor 105.

The temporal descriptor is updated at step 640 using the current state of the temporal information as described above, and the current frame number although the creation time Cf of the mode is unchanged. The match count for the element model is incremented, until a maximum match count is reached. The last match frame for the mode is set to the current frame number at step 640. The deletion time for the element model is updated using the deletion time expression shown in Equation (7) above. The visual descriptor is updated using the visual features of the input superpixel visual element. In one arrangement, an approximated median update method is used using a learning rate threshold $LR_{max}$. The learning rate threshold $LR_{max}$ represents the maximum change allowed for a mode feature per update. An approximate median filter used in the approximated median method is defined in accordance with Equation (10) as follows:

$$C_v^{t+1} = f(C_v^t, C_l, LR_{max}) \quad (10)$$

where $C_v^t$ denotes the coefficient value at time t for mode v which is used in scene matching step 860, $C_v^{t+1}$ represents an updated mode coefficient value which will be used for scene matching in a next image (or frame) (i.e., at time t+1), $C_l$ represents the coefficient of the corresponding input element in the input image and f represents the approximated median updating function which can be further defined in accordance with Equation (11) as follows:

$$C_v^{t+1} = \begin{cases} C_v^t + \min(|C_v^t - C_l|, LR_{max}); & \text{if } C_v^t - C_l^1 \geq 0 \\ C_v^t - \min(|C_v^t - C_l|, LR_{max}); & \text{otherwise} \end{cases} \quad (11)$$

Figure 13:
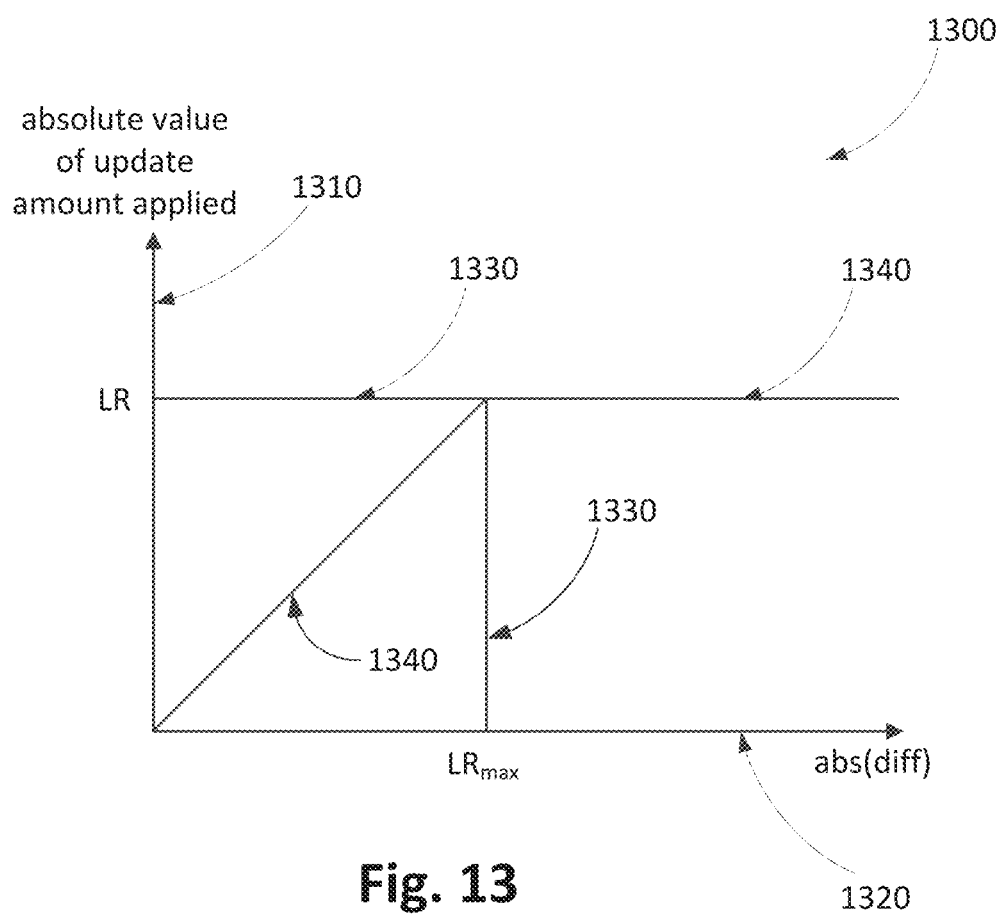
FIG. 13 is a graph that shows how the value of a learning rate threshold $LR_{max}$ controls maximum change in a coefficient value.

FIG. 13 is a graph 1300 that shows how the value of the learning rate threshold $LR_{max}$ controls a maximum change in the mode coefficient value per update. As shown in FIG. 13, vertical axis 1310 on the graph 1300 is an absolute update amount to be applied to the mode coefficient value. The absolute update amount is added to the coefficient value for the mode where the input coefficient value is greater than the mode coefficient value. The absolute update amount is subtracted from the coefficient value where the input coefficient value is less than the mode coefficient value.

The horizontal axis 1320 on the graph 1300 is the absolute difference between the input coefficient value and mode coefficient value, which will be referred to below as the absolute difference. The line 1340 represents an absolute update amount 1340 applied to the mode coefficient value, for a given absolute difference. When the absolute difference is less than the value of the learning rate threshold $LR_{max}$ 1330, the absolute difference is the absolute update amount 1340. When the absolute difference is greater than the learning rate threshold $LR_{max}$ 1330, the value of the learning rate threshold $LR_{max}$ is the absolute update amount 1340.

In contrast, foreground that obscures background can briefly appear as background with a significant change over a small period of time. Therefore, the high learning rate threshold is limited. (i.e., high learning rate threshold is not infinite). In one arrangement, $LR_{max}=10$ for eight (8) bit input colour features. Following step 640, the method 600 returns to decision step 610.

If it is determined at step 610 that all input superpixel visual elements have been processed, then method 600 concludes via NO arrow.

After the scene model has been updated at step 870, then the method 800 continues to generating step 880, pixel level foreground segmentation is generated under execution of the processor 105 based on foreground/background status determined in the scene model matching step 860. All pixels belonging to superpixel visual elements which have foreground status as determined at step 880 are marked foreground. Remaining pixels are marked background. The execution of step 880 results in a pixel level foreground segmentation mask which may be stored in the RAM 170.

After step 880, the method 800 continues to decision step 890 to check if there are more input images to be processed. If there are more input images to process, then the method 800 continues to step 810 via the YES arrow. If all the input images have been processed, then the method 800 ends via the NO arrow.

The superpixel segmentation in the method 800 described above uses grid based seed point placement. In another arrangement, non-grid based seed points may be used in the method 800. A method 1600 of segmenting input images in a video sequence, using non-grid based superpixel segmentation which may be alternatively executed at step 820 will now be described.

The method 1600 is very similar to the process previously described in relation to step 310. The method 1600 may be implemented as one or more software code modules of the software application program 133 resident in the storage module 109 and being controlled in its execution by the processor 105.

The method 1600 begins at creating step 1605, where an appropriate number of seeds points are created for the input image received at step 810 in the manner described above in relation to step 305. Once the number of required superpixel segments has been determined, then the method 1600 moves to step 1610.

Processing steps 1610, 1620 and 1630 are the same as processing steps 310, 320 and 330 of the process 300 as described above. At step 1610, a derived image measuring the strength of scene boundary is determined from the input image received at step 810 in the manner described above for step 310. Then at step 1620, a fixed scalar offset is added to the derived image under execution of the processor 105 in the manner described above for step 320. Then at step 1630, a random noise offset, also known as random noise pattern, is added to at least a portion of the derived image under execution of the processor 105 in the manner described above for step 330.

After finishing step 1630, the method 1600 moves to step 1640, where local minima of the boundary cost image is detected under execution of the processor 105. A local minimum is a point with a lowest measure of boundary strength within a neighbourhood of the point. The local minima determined at step 1630 will be used as seeds for superpixel segmentation in step 1650. The noise addition in step 1630 ensures an even distribution of detected local minima everywhere in the cost image, including in flat regions in the derived image. In one arrangement, the neighbourhood used in step 1640 comprises pixels in a square window of size (2r+1)-by-(2r+1) around the neighbourhood centre. The neighbourhood radius r relates to a desired average area of the output superpixels. The average superpixel area equals the ratio between the total number of pixels in the input image received at step 810 and the desired number of output superpixels as estimated in step 1605. Such local minima over a fixed size neighbourhood can be found using a non-maximal suppression technique. Non-maximal suppression detects local maxima over a rectangular neighbourhood. To find local minima, non-maximal suppression is applied to a negated boundary cost image. Non-maximal suppression guarantees a minimum separation distance between the selected minima. However, non-maximal suppression does not produce an exact number of desired local minima. In another arrangement, an exact number of desired local minima is determined from the boundary cost image using adaptive non-maximal suppression. Adaptive non-maximal suppression selects an oversupply of initial local maxima using non-maximal suppression with a small neighbourhood window. A suppression radius is then determined for each local maximum, where suppression radius refers to the radius of a largest square neighbourhood, whose pixels are all smaller than the local maximum. A desired number of local maxima with the highest suppression radii are then selected from the list of initial local maxima. The output of step 1640 is the location of seed points which may be stored in RAM 170.

The processing steps 1650, 1660 and 1670 are similar to processing steps 350, 360, 370 and 380. At determining step 1650, a geodesic distance transform on a geodesic space defined by the boundary cost image is generated using the seed points generated in step 1640 in the manner described above for step 350. Then at step 1660, the processor 105 is used to determine whether or not to perform superpixel refinement by seed re-centroiding followed by another iteration of geodesic distance transform in the manner described above for step 360. At step 1670, the seed points are reinitialised to the centroids of previously determined superpixels in the manner described above for step 370.

The method 1600 generates non-gridded seed point based superpixel segmentation. An example of non-gridded seed point based superpixel segmentation is shown in FIGS. 17A, 17B and 17C.

Figure 17A:
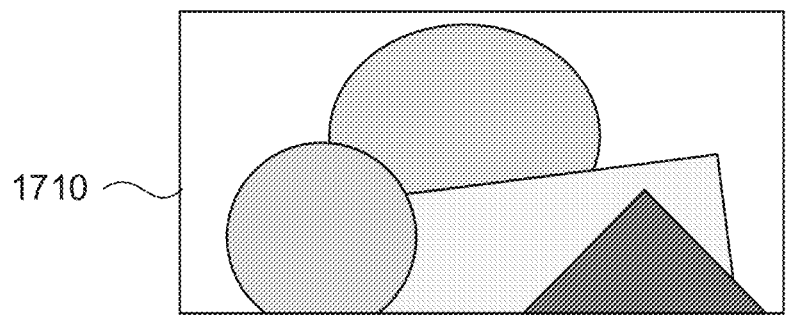
FIG. 17A shows an example input image (frame)
Figure 17B:
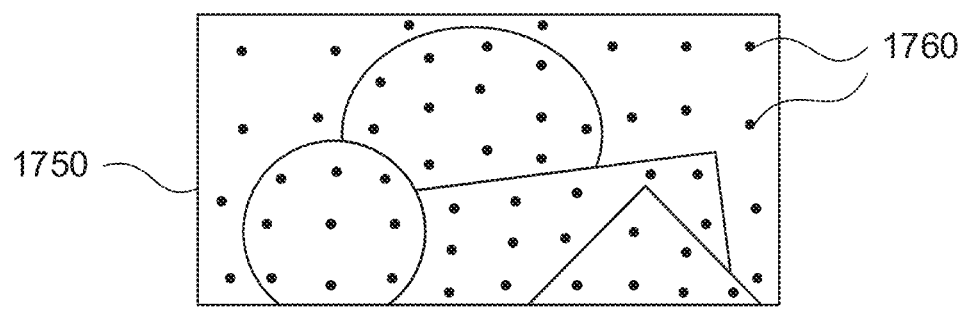
FIG. 17B shows the location of seed points in the input image (frame) of FIG. 17A.
Figure 17C:
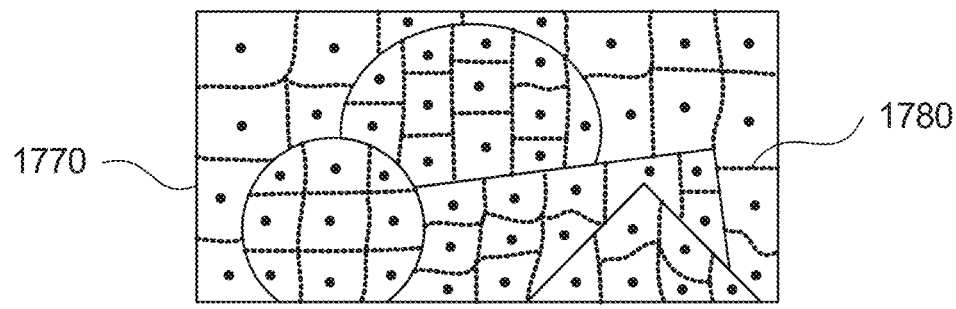
FIG. 17C shows superpixel segmentation of the input image (frame) of FIG. 17A.
Figure 18:
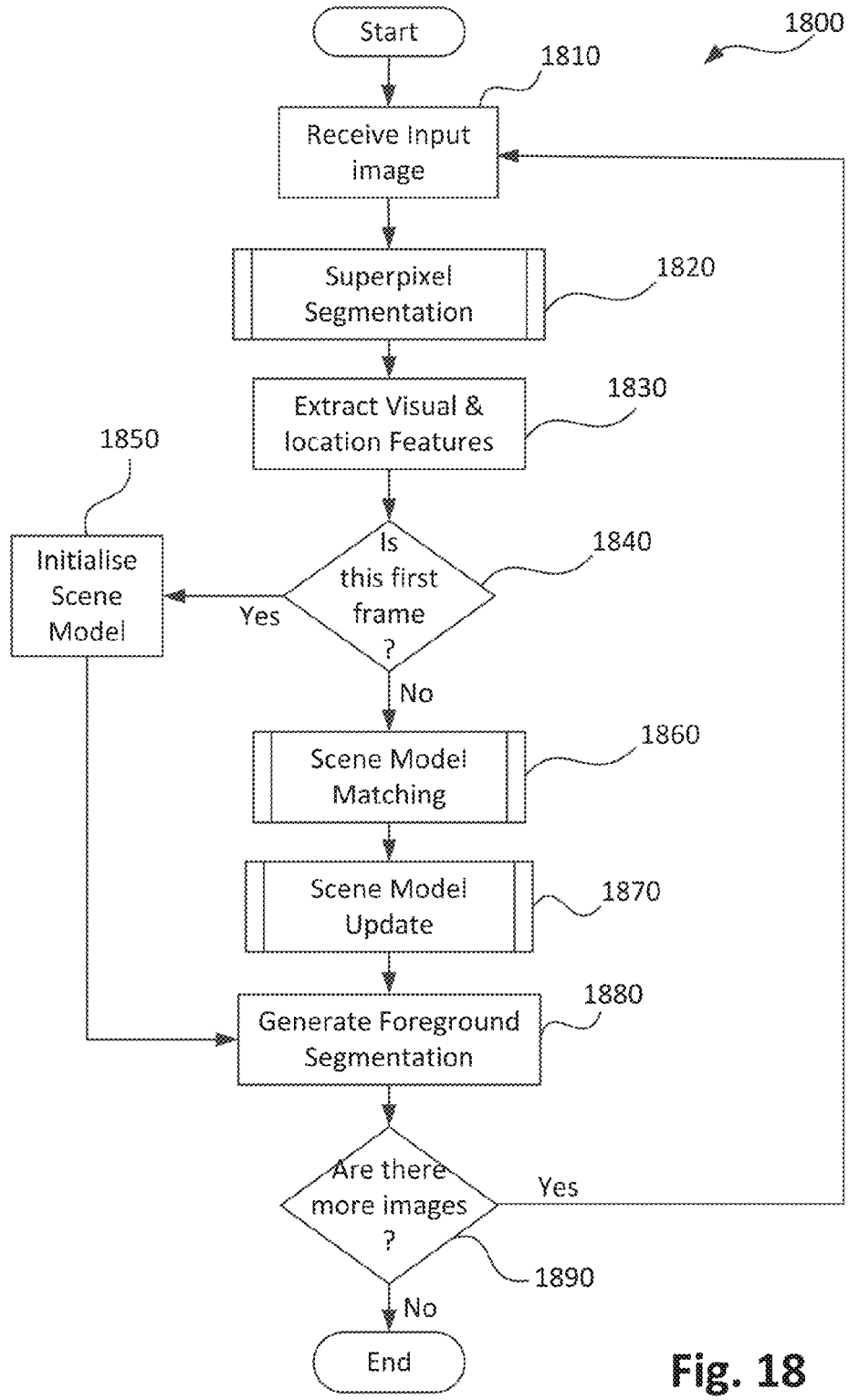
FIG. 18 is a schematic flow diagram showing a method of updating a scene model for an image using non-gridded superpixel visual elements.

FIG. 17A shows an example input image 1710. FIG. 17B shows the position of seed points in the input image 1710 and FIG. 17C shows a resulting superpixel segmentation.

A method 1800 of updating a scene model for an image using non-gridded superpixel visual elements. The method 1800 may be implemented as one or more software code modules of the software application program 133 resident in the storage module 109 and being controlled in its execution by the processor 105.

The method 1800 begins at receiving step 1810 which is the same as step 810 of method 800. At step 1810, an input image is received from the image sensing device 110 under execution of the processor 105 and is stored in the RAM 170 in the manner described above for step 810.

Then at determining step 1820, the processor 105 executes superpixel based image segmentation method 1600 on the image received at step 1610 to determine dynamic superpixel visual elements for the image. After generating non-gridded superpixel segmentation, the method 1800 continues to step 1830.

At extracting step 1830, visual and location features for superpixel visual elements are extracted under execution of the processor 105. The visual feature extraction performed at step 1830 is similar to the process described above in relation to step 830. However, extraction of the location features will now be described. In one arrangement, the centroid of a superpixel visual element is used as a location feature. In another arrangement an elliptic approximation is fitted to represent shape of a superpixel visual element using $[\mu_x \ \mu_y \ \sigma_x^2 \ \sigma_{xy} \ \sigma_y^2]$ where, $\mu_x$ and $\mu_y$ are mean of x and y coordinates of all pixels which lie within the superpixel visual element, and $\sigma_x^2$, $\sigma_y^2$ and $\sigma_{xy}$ are x-variance, y variance and xy co-variance respectively. The output of step 1830 is a list of visual and location features for each superpixel visual element.

After extracting visual features of the input image the method 1800 moves to decision step 1840. If the input image is the first image (frame) to be processed, the method 1800 proceeds to step 1850. If the input image is not the first image (frame) to be processed, then the process method 1800 proceeds to step 1860.

Figure 20:
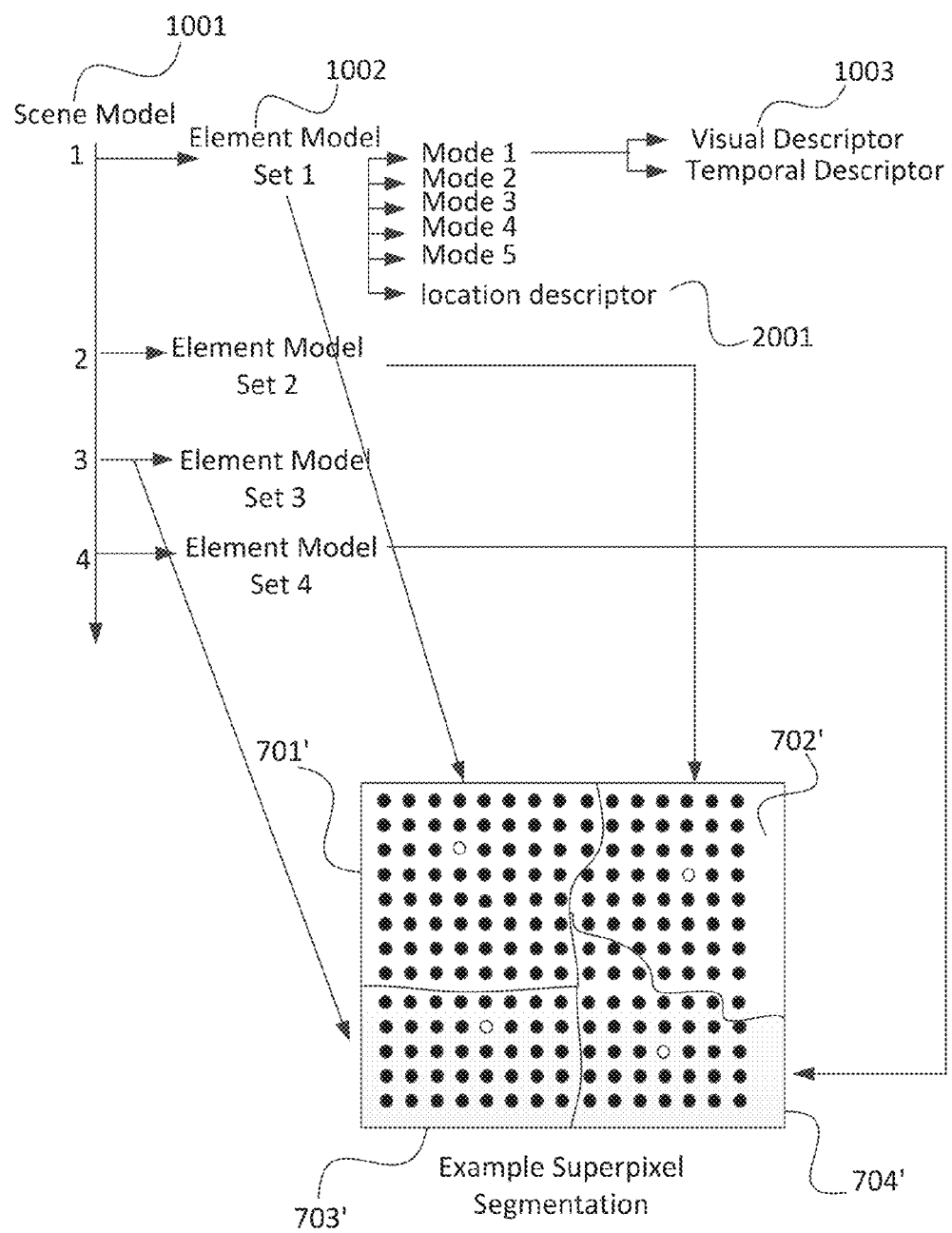
FIG. 20 is an example of structure of a scene model for non-gridded based superpixel segmentation.

Initialising step 1850 is similar to step 850. At step 1850 the scene model for the input image received at step 1810 is initialised using the features determined in step 1830. However, as described in relation to step 850, a scene model comprises visual element model sets where each visual element model set comprises multiple modes. In contrast, in the case of non-gridded based superpixel segmentation, each location of the non-gridded seed points may change image (frame) by image (frame). Therefore, each visual element model set also stores location features (e.g. location of the centroid of a superpixel visual element) as part of a location descriptor per set to associate a visual element model set with the corresponding location feature (e.g. location of the centroid of the superpixel visual element). FIG. 20 shows an example of a structure of a scene model for non-gridded based superpixel segmentation. FIG. 20 shows that a location descriptor 1002 including the location features is associated with Element Model Set 1 1002. The remainder of the step 1850 is same as step 850 as described.

After finishing the scene model initialisation, the method 1800 moves to matching step 1860.

Figure 19:
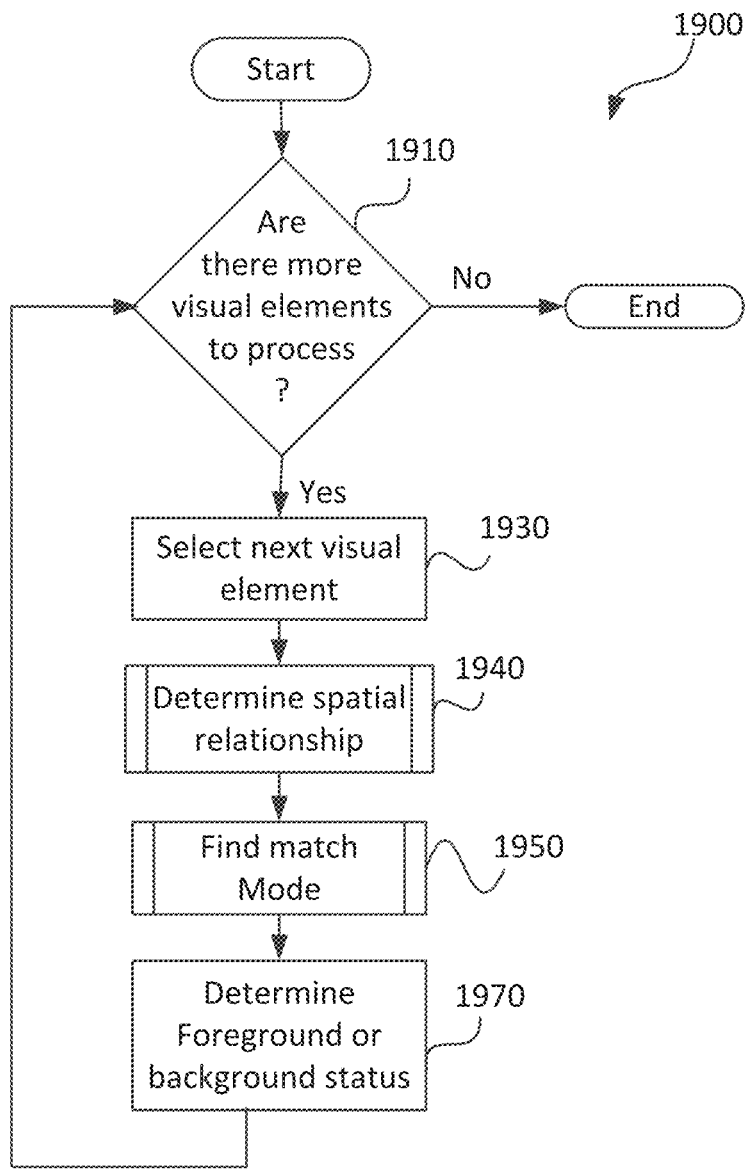
FIG. 19 is a schematic flow diagram showing a method of matching a scene model using non-gridded seed points.

At matching step 1860, the input image is matched to the scene model and the foreground/background status of the superpixel visual elements of the input image is determined. A method 1900 of matching a scene model to an image, as executed at step 1860, will now be described with reference to FIG. 19. The steps 1910, 1920, 1930, 1950 and 1970 of the method 1900 are similar to steps 510, 520, 530, 550 and 570 respectively of the method 500 shown in FIG. 5.

The method 1900 may be implemented as one or more software code modules of the software application program 133 resident in the storage module 109 and being controlled in its execution by the processor 105.

The method 1900 begins at a first decision step 1910, where the processor 105 is used to check if all the input superpixel visual elements of the input image have been compared to the scene model in the same manner to that described for step 510. If all input superpixel visual elements have been compared to the scene model, then the method 1900 concludes. Otherwise, the method 1900 proceeds to step 1930.

Then at selecting step 1930, under execution of the processor 105, a next input superpixel visual element is selected from the list of superpixel visual elements generated at step 1830, in the manner described above for step 530.

The method 1900 continues at determining step 1940, where the processor 105 is used to determine visual element model sets for each input superpixel visual element for scene model matching. In one arrangement, when a centroid is used as the location feature for a superpixel visual element in the input image, a closest visual element model set having a location feature is identified from the scene model at step 1940. In another arrangement, a Euclidean distance formulation is used at step 1940 to determine a closest visual element model set. In another arrangement, a Sum of Absolute Difference is used at step 1940 as a distance formulation to determine a closest visual element model set.

In another arrangement, all visual element model sets with in a pre-determined distance region from the centroid of the superpixel visual element are selected at step 1940. A possible value for the pre-determined distance is $$= 2 * \sqrt{\frac{\text{total pixels in the image}}{\text{total number of superpixels}}}.$$

The output of step 1940 is selected visual element model sets which are used to match the superpixel visual element selected at step 1930.

The method 1900 then proceeds to 1950, where all modes in the set of element model sets of the scene model are used to compare the superpixel visual element selected at step 1930 to determine a best matched mode in the manner described above for step 550.

After determining the best match mode, the method 1900 continues from the step 1950 to the status determining step 1970. At step 1970 the foreground/background status of the visual element selected at step 1930 is determined under execution of the processor 105. Following step 1970, the method 1900 returns to step 1910.

Returning to the method 1800, after finishing step 1860, the method 1800 moves to updating step 1870 where the scene model is updated based on the scene model matching results from step 1860. Each location feature in the location descriptor for each element model set is updated, for example, every image (frame). In one arrangement, for each element model set, the nearest location of a centroid of a visual element in the input image to a location feature associated with each element model set is determined at step 1870. Then the location feature is updated to the nearest location. The nearest location may be the same for more than one element model set by accident. In that case, the element model sets are merged. In another arrangement, the location feature is only updated if a best match score based on the matching result from step 1860 is higher than a threshold say 0.7.

Steps 1880 and 1890 are the same as steps 880 and 890 respectively. At generating step 1880, pixel level foreground segmentation is generated under execution of the processor 105 based on foreground/background status determined in the scene model matching step 1860. Then at decision step 1890, if there are more input images to be processed, then the method 1800 continues to step 1810 via the YES arrow. If all the input images have been processed, then the method 1800 ends via the NO arrow. The superpixel visual element based scene modelling and foreground segmentation described above has several advantages. Since each superpixel is a collection of pixels, superpixel visual element based scene modelling and foreground segmentation has similar memory and computation cost as a block based approach and much lower cost than a pixel-based approach.

Further, superpixel segmentation preserves salient features of images by respecting edges. Preserving salient features of images by respecting edges allows higher robustness to shaky videos and video scenarios with dynamic background compared to block based approaches. Additionally, superpixel visual element based scene modelling also achieves more accurate foreground mask compared to block-based methods because block-based methods generate blocky outputs while superpixel segmentation follows edges in the image.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of updating a scene model for a foreground segmentation of an input image captured from a camera, the method comprising:
    determining one or more dynamic visual elements of the input image, wherein the one or more dynamic visual elements change in form as time passes;
    determining one or more dynamic visual elements each included in the scene model corresponding to the one or more dynamic visual elements in the input image, the one or more dynamic visual elements in the input image being different from each other;
    determining whether each of the one or more dynamic visual elements of the input image is foreground or background on a basis of the determined one or more dynamic visual elements included in the scene model; and
    updating the scene model on a basis of each of the one or more dynamic visual elements of the input image and the determined one or more dynamic visual elements included in the scene model,
    wherein the one or more dynamic visual elements included in the scene model is determined by selecting a nearest seed point to a centroid of the dynamic visual element for matching the input image to the scene model.

2. The method according to claim 1, wherein the scene model is based on a visual segmentation.

3. The method according to claim 1, wherein the one or more dynamic visual elements included in the scene model is determined by selecting a plurality of seed points which lie within the dynamic visual element.

4. The method according to claim 1, wherein the one or more dynamic visual elements included in the scene model is determined by selecting a nearest seed point in a neighborhood outside the dynamic visual element.

5. The method according to claim 1, further comprising selecting one or more seed points to create a new mode for the scene model.

6. The method according to claim 1, further comprising updating a location feature to update the scene model.

7. The method according to claim 1, further comprising determining one or more dynamic visual elements of the input image based on features that are extracted from the input image.

8. An apparatus for updating a scene model for a foreground segmentation of an input image captured by a camera, the apparatus comprising:
    a memory for storing data and a computer program;
    a processor coupled to the memory for executing the computer program, the computer program comprising instructions for:
        determining one or more dynamic visual elements of the input image, wherein the one or more dynamic visual elements change in form as time passes;
        determining one or more dynamic visual elements each included in the scene model corresponding to the one or more dynamic visual elements in the input image, the one or more dynamic visual elements in the input image being different from each other;
        determining whether each of the one or more dynamic visual elements of the input image is foreground or background on a basis of the determined one or more dynamic visual elements included in the scene model; and
        updating the scene model on a basis of each of the one or more dynamic visual elements of the input image and the determined one or more dynamic visual elements included in the scene model,
        wherein the one or more dynamic visual elements included in the scene model is determined by selecting a nearest seed point to a centroid of the dynamic visual element for matching the input image to the scene model.

9. A system for updating a scene model for a foreground segmentation of an input image captured by a camera, the system comprising:
    a memory for storing data and a computer program;
    a processor coupled to the memory for executing the computer program, the computer program comprising instructions for:
        determining one or more dynamic visual elements of the input image, wherein the one or more dynamic visual elements change in form as time passes;
        determining one or more dynamic visual elements each included in the scene model corresponding to the one or more dynamic visual elements in the input image being different from each other;
        determining whether each of the one or more dynamic visual elements of the input image is foreground or background on a basis of the determined one or more dynamic visual elements included in the scene model; and
        updating the scene model on a basis of each of the one or more dynamic visual elements of the input image and the determined one or more dynamic visual elements included in the scene model,
        wherein the one or more dynamic visual elements included in the scene model is determined by selecting a nearest seed point to a centroid of the dynamic visual element for matching the input image to the scene model.

10. A non-transitory computer readable storage medium comprising a computer program stored thereon for updating a scene model for a foreground segmentation of an input image captured by a camera, the program comprising:
    code for determining one or more dynamic visual elements of the input image, wherein the one or more dynamic visual elements change in form as time passes;
    code for determining one or more dynamic visual elements each included in the scene model corresponding to the one or more dynamic visual elements in the input image being different from each other;
    code for determining whether each of the one or more dynamic visual elements of the input image is foreground or background on a basis of the determined one or more dynamic visual elements included in the scene model; and
    code for updating the scene model on a basis of each of the one or more dynamic visual elements of the input image and the determined one or more dynamic visual elements included in the scene model,
    wherein the one or more dynamic visual elements included in the scene model is determined by selecting a nearest seed point to a centroid of the dynamic visual element for matching the input image to the scene model.

* * * * *